United States Patent
Inoue et al.

(10) Patent No.: US 8,473,702 B2
(45) Date of Patent: Jun. 25, 2013

(54) INFORMATION PROCESSING APPARATUS, EXECUTION ENVIRONMENT TRANSFERRING METHOD AND PROGRAM THEREOF

(75) Inventors: Hiroaki Inoue, Tokyo (JP); Tsuyoshi Abe, Tokyo (JP); Junji Sakai, Tokyo (JP); Masato Edahiro, Tokyo (JP)

(73) Assignee: NEC Corporation, Tokyo (JP)

( * ) Notice: Subject to any disclaimer, the term of this patent is extended or adjusted under 35 U.S.C. 154(b) by 559 days.

(21) Appl. No.: 12/602,871

(22) PCT Filed: Jun. 5, 2008

(86) PCT No.: PCT/JP2008/060338
§ 371 (c)(1),
(2), (4) Date: Dec. 3, 2009

(87) PCT Pub. No.: WO2008/152967
PCT Pub. Date: Dec. 18, 2008

(65) Prior Publication Data
US 2010/0199052 A1    Aug. 5, 2010

(30) Foreign Application Priority Data
Jun. 12, 2007   (JP) .................. 2007-155149

(51) Int. Cl.
*G06F 12/00* (2006.01)
(52) U.S. Cl.
USPC ............. 711/165; 711/170; 711/E12.001
(58) Field of Classification Search
USPC ............. 711/165, 170, 141, 113, E12.001
See application file for complete search history.

(56) References Cited

U.S. PATENT DOCUMENTS

| | | | | |
|---|---|---|---|---|
| 6,138,140 A | * | 10/2000 | Yokote | 709/203 |
| 6,275,917 B1 | * | 8/2001 | Okada | 711/207 |
| 8,010,679 B2 | * | 8/2011 | Low et al. | 709/227 |
| 2009/0037932 A1 | * | 2/2009 | Clark et al. | 719/315 |
| 2010/0192123 A1 | * | 7/2010 | Carey et al. | 711/170 |

FOREIGN PATENT DOCUMENTS

| | | |
|---|---|---|
| JP | 2000222376 A | 8/2000 |
| JP | 2004088200 A | 3/2004 |
| JP | 2004234114 A | 8/2004 |
| JP | 2006244481 A | 9/2006 |

OTHER PUBLICATIONS

I. Nagasawa et al., "A Prototype of Heterogeneous Process Migration Mechanism", Information Processing Society of Japan Kenkyu Hokoku, Nov. 20, 1992, vol. 92, vol. 91, pp. 173-180.

(Continued)

*Primary Examiner* — Pierre-Michel Bataille

(57) ABSTRACT

Provided is an information processing device which enables transfer of an execution environment in a short time period without degrading basic performance of an execution environment and without requiring a large amount of memory.
The information processing device comprises a basic side CPU 100 for executing basic processing and an addition side CPU 200 for executing additional processing, in which a transfer management unit 300 provided on the basic side CPU 100 transfers execution environment data 1000 including constitution information of an execution environment 30 of the additional processing to be executed on the addition side CPU and data in a memory corresponding to the execution environment to other information processing device and restores the execution environment to re-start the addition side CPU based on the received execution environment data 1000.

53 Claims, 21 Drawing Sheets

OTHER PUBLICATIONS

K. Park et al., "Process Migration Policies in Distributed Operating Systems", Transactions of Information Processing Society of Japan, Jul. 15, 1990, vol. 31, No. 7, pp. 1080-1090.

Japanese Office Action for JP2009-519233 mailed on Oct. 25, 2012.

Toru Miyahara et al., Xen utilization method(2) Live Migration, Virtualization Technology Expert, Japan, Gijutsu-Hyohron Co., Ltd.

Yusuke Tanimura et al., "Comparison of Methods for Providing an IP Storage to a Virtual Cluster System", IPSJ SIG Technical Report, Mar. 1, 2007, vol. 2007, No. 17, p. 109-114.

"Xen" immediately utilizable on main Linux distribution, Nikkei Linux, Japan, Nikkei BP, Nov. 2006, (vol. 86), pp. 46-55.

International Search Report for PCT/JP2008/060338 mailed Jul. 8, 2008.

* cited by examiner

| CPU | START POINT | END POINT | ALLOWED BIT |
|---|---|---|---|
| BASIC CPU | 0x00000000 | 0xFFFFFFFF | R·W |
| ADDITION SIDE CPU | 0x00800000 | 0x00FFFFFF | R |
| | 0x31000000 | 0x31FFFFFF | R·W |
| | 0x32000000 | 0x327FFFFF | R |
| | 0x32800000 | 0x32FFFFFF | R·W |

421 PHYSICAL CPU MANAGEMENT DATA

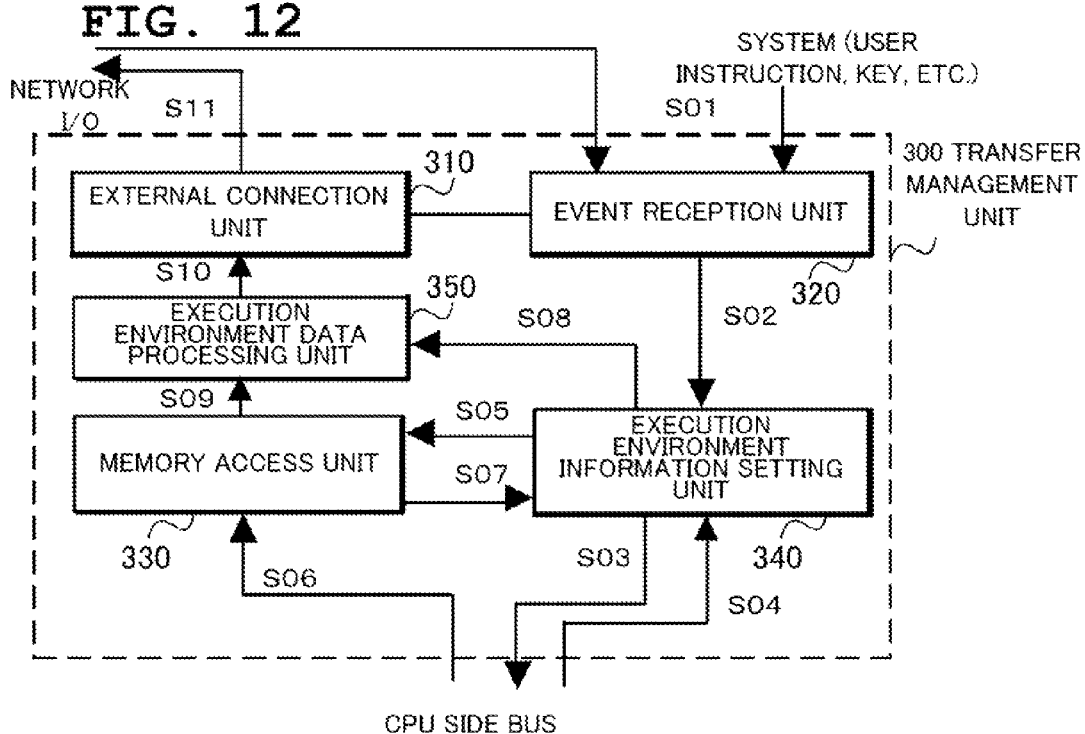
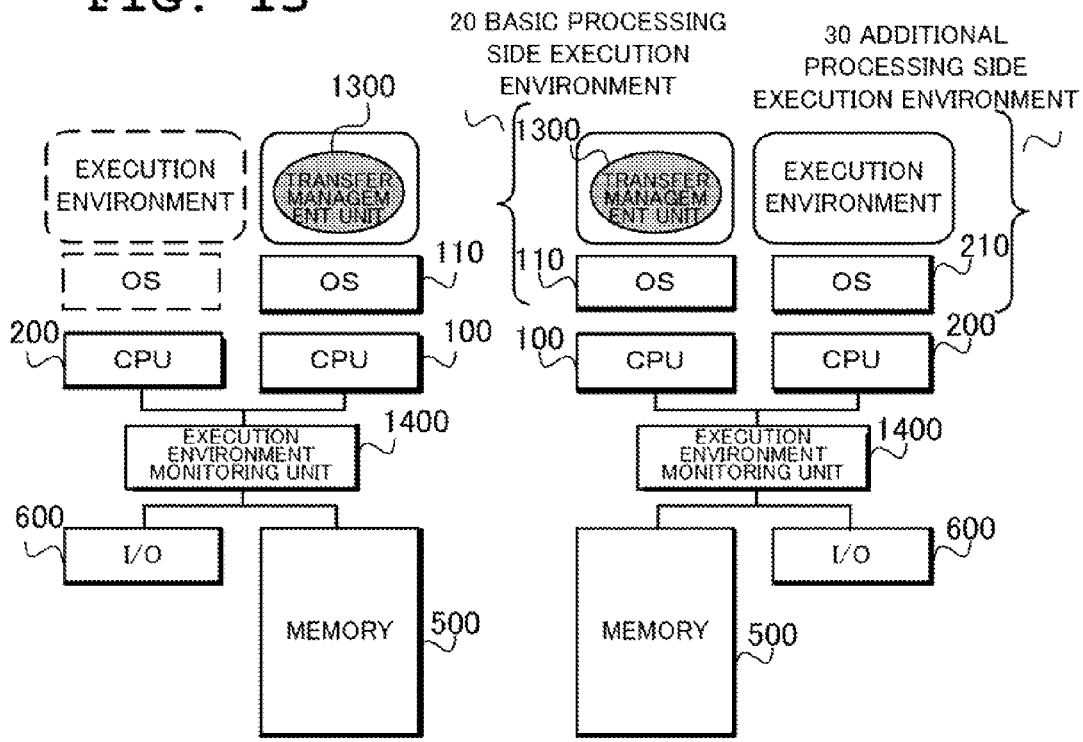

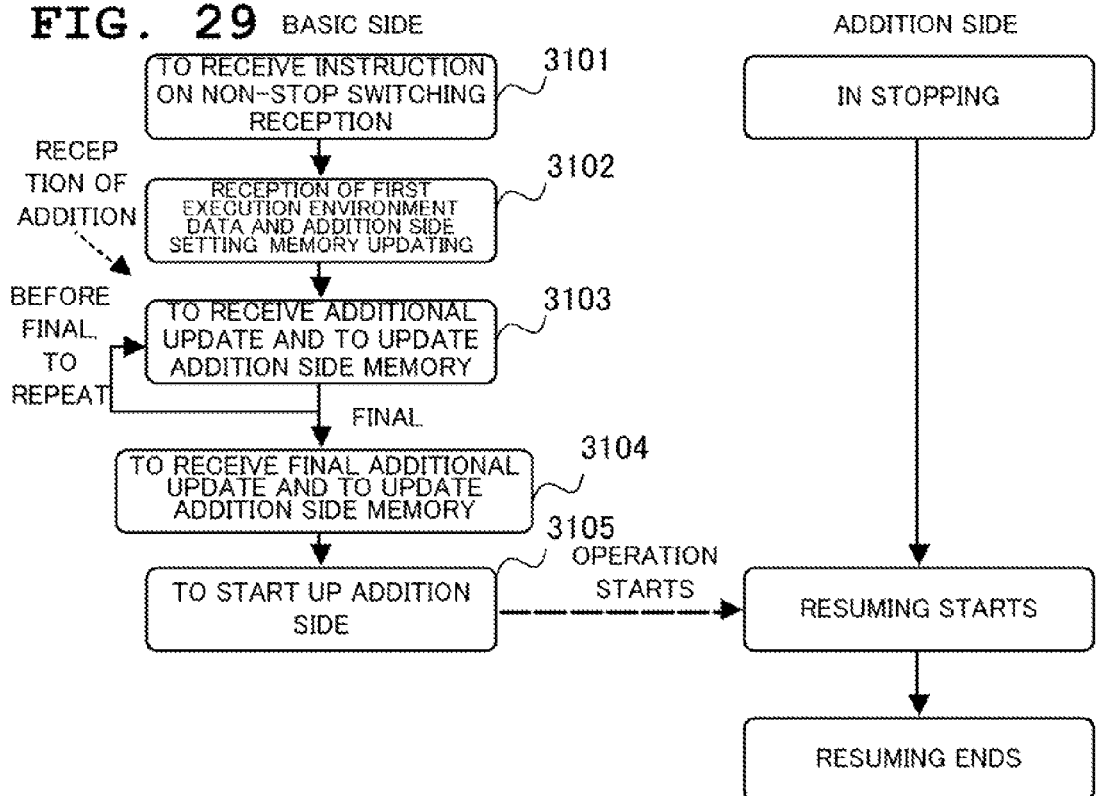
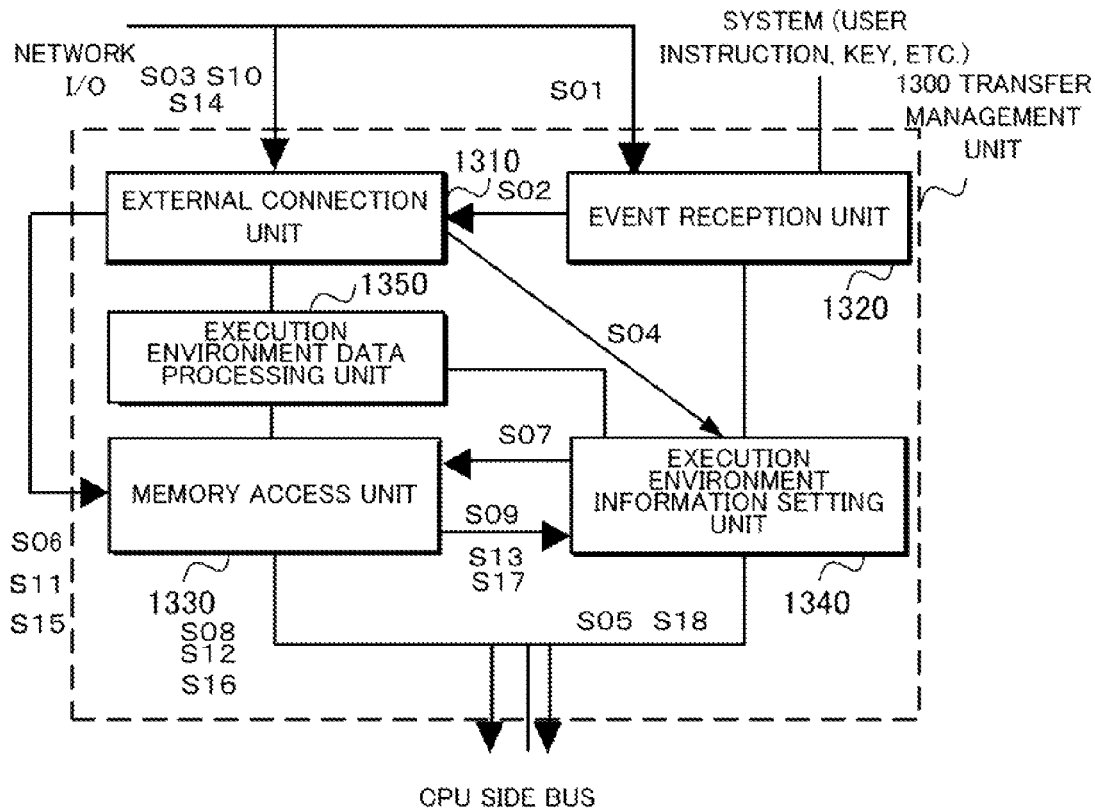

INFORMATION PROCESSING APPARATUS, EXECUTION ENVIRONMENT TRANSFERRING METHOD AND PROGRAM THEREOF

INCORPORATION BY REFERENCE

This application is the National Phase of PCT/JP2008/060338, filed Jun. 5, 2008, which is based upon and claims the benefit of priority from Japanese patent application No. 2007-155149, filed on Jun. 12, 2007, the disclosure of which is incorporated herein in its entirety by reference.

TECHNICAL FIELD

The present invention relates to an information processing apparatus and, more particularly, to an information processing device comprising a basic side processing unit which executes basic processing and an addition side processing unit which executes additional processing, and an execution environment transferring method of transferring an execution environment to be executed by an information processing device to other information processing device and a program thereof.

BACKGROUND ART

Provided so far is a server/client system which causes such a program as an application or a device introduced into a computer such as a server to be executed on other terminal device through network communication.

In such a server/client system, only an application or a device on a server device is used on a terminal device and it is impossible to transfer an execution environment including an operating system (OS) and a program such as an application or a device operable on the OS from the server device to the terminal device.

Related art for transferring an execution environment itself including an OS and an application or a device operable on the OS from a certain computer device to other computer device and using the same is disclosed, for example, in Patent Literature 1 (Japanese Patent Laying-Open No. 2006-244481).

Disclosed in the system recited in Patent Literature 1 is a technique of causing a plurality of nodes of a cluster computing system to execute a plurality of virtual machines, while migrating a virtual machine on a certain node to other node. Use of the technique recited in Patent Literature 1 enables an execution environment including an OS of a certain device to be transferred (migration) as a virtual machine to other device.

Disclosed in Patent Literature 2 (Japanese Patent Laying-Open No. 2004-234114) is a computer system for migrating an OS among a plurality of computers. The technique recited in Patent Literature 2 enables migration of an OS between computers by transmitting context of an OS from a certain computer to other computer through a communication path and restoring the received OS on other computer.

Patent Literature 1: Japanese Patent Laying-Open No. 2006-244481
Patent Literature 2: Japanese Patent Laying-Open No. 2004-234114.

When transferring an execution environment by using a virtual machine as recited in the above-described Patent Literature 1, because it is necessary to once preserve a virtual machine environment as a file on memory and thereafter transfer the virtual machine environment to other device, a large amount of memory is required, as well as consuming time for transferring an execution environment.

Another problem is that because an execution environment is set up by a virtual machine, basic performance of the execution environment is degraded.

The computer system recited in Patent Literature 2 has a further problem that only an OS is migrated between a plurality of computers and an execution environment itself including the OS cannot be migrated.

OBJECT OF THE PRESENT INVENTION

An object of the present invention is to provide an information processing apparatus, an execution environment transferring method and a program thereof which enable transfer of an execution environment in a short time period without degrading basic performance of the execution environment and without requiring a large amount of memory, which are the above-described problems.

SUMMARY

An information processing device according to a first exemplary aspect of the present invention includes a basic side processing unit which executes basic processing, and an addition side processing unit which executes additional processing, wherein a transfer management unit provided in the basic side processing unit transfers execution environment data including constitution information of an execution environment of additional processing to be executed by the addition side processing unit and data in memory corresponding to the execution environment to other information processing device and restores the execution environment based on the received execution environment data to re-start the addition side processing unit.

An information processing device according to a second exemplary aspect of the present invention includes a basic side processing unit which executes basic processing, and an addition side processing unit which executes additional processing, wherein a transfer management unit provided in the basic side processing unit stops the addition side processing unit, transfers execution environment data including constitution information of an execution environment of additional processing to be executed by the addition side processing unit and data in memory corresponding to the execution environment to other information processing device and upon receiving execution environment data from other information processing device, restores an execution environment onto memory based on the execution environment data to re-start the addition side processing unit.

In an execution environment transferring method according to a first exemplary aspect of the present invention, when between information processing devices comprising a basic side processing unit which executes basic processing and an addition side processing unit which executes additional processing, an execution environment of the additional processing to be executed on the addition side processing unit is transferred, the basic side processing unit of a transfer side information processing device transfers execution environment data including constitution information of the execution environment of the additional processing to be executed by the addition side processing unit and data in memory corresponding to the execution environment to other information processing device, and the basic processing unit of the reception side information processing device restores the execution environment based on the received execution environment data to re-start the addition side processing unit.

In an execution environment transferring method according to a second exemplary aspect of the present invention, when between information processing devices comprising a basic side processing unit which executes basic processing and an addition side processing unit which executes additional processing, an execution environment of the additional processing to be executed on the addition side processing unit is transferred, the basic side processing unit of a transfer side information processing device stops the addition side processing unit to transfer execution environment data including constitution information of the execution environment of the additional processing to be executed by the addition side processing unit and data in memory corresponding to the execution environment to other information processing device, and the basic processing unit of the reception side information processing device restores the execution environment onto memory based on the received execution environment data to re-start the addition side processing unit.

An execution environment transferring program according to a first exemplary aspect of the present invention, in order to transfer, between information processing devices comprising a basic side processing unit which executes basic processing and an addition side processing unit which executes additional processing, an execution environment of the additional processing to be executed on the addition side processing unit, causes the information processing device to execute the processing by the basic side processing unit of a transfer side information processing device to transfer execution environment data including constitution information of the execution environment of the additional processing to be executed by the addition side processing unit and data in memory corresponding to the execution environment to other information processing device and the processing by the basic processing unit of the reception side information processing device to restore the execution environment based on the received execution environment data to re-start the addition side processing unit.

An execution environment transferring program according to a second exemplary aspect of the present invention, in order to transfer, between information processing devices comprising a basic side processing unit which executes basic processing and an addition side processing unit which executes additional processing, an execution environment of the additional processing to be executed on the addition side processing unit, causes the information processing device to execute the processing by the basic side processing unit of a transfer side information processing device to stop the addition side processing unit and transfer execution environment data including constitution information of the execution environment of the additional processing to be executed by the addition side processing unit and data in memory corresponding to the execution environment to other information processing device, and the processing by the basic processing unit of the reception side information processing device to restore the execution environment onto memory based on the received execution environment data to re-start the addition side processing unit.

The present invention enables transfer of an execution environment in a short time period without degrading basic performance of an execution environment of additional processing and without requiring a large amount of memory.

BRIEF DESCRIPTION OF THE DRAWINGS

FIG. 12 is a diagram showing detailed operation of the transfer management unit in the copying processing of the additional processing side execution environment by stop transfer method according to the first exemplary embodiment of the present invention;

FIG. 13 is a block diagram showing an entire structure of an information processing device according to a second exemplary embodiment of the present invention;

FIG. 29 is a flow chart for use in explaining the contents of operation on the basic processing side and the additional processing side of the information processing device on a reception side in non-stop switching reception according to the second exemplary embodiment of the present invention;

FIG. 30 is a diagram showing detailed operation of a transfer management unit 1300 on the reception side in the non-stop switching reception according to the second exemplary embodiment of the present invention;

EXEMPLARY EMBODIMENT

In the following, preferred exemplary embodiments of the present invention will be detailed with reference to the drawings.

First Exemplary Embodiment

Description of Structure

Figure 1:
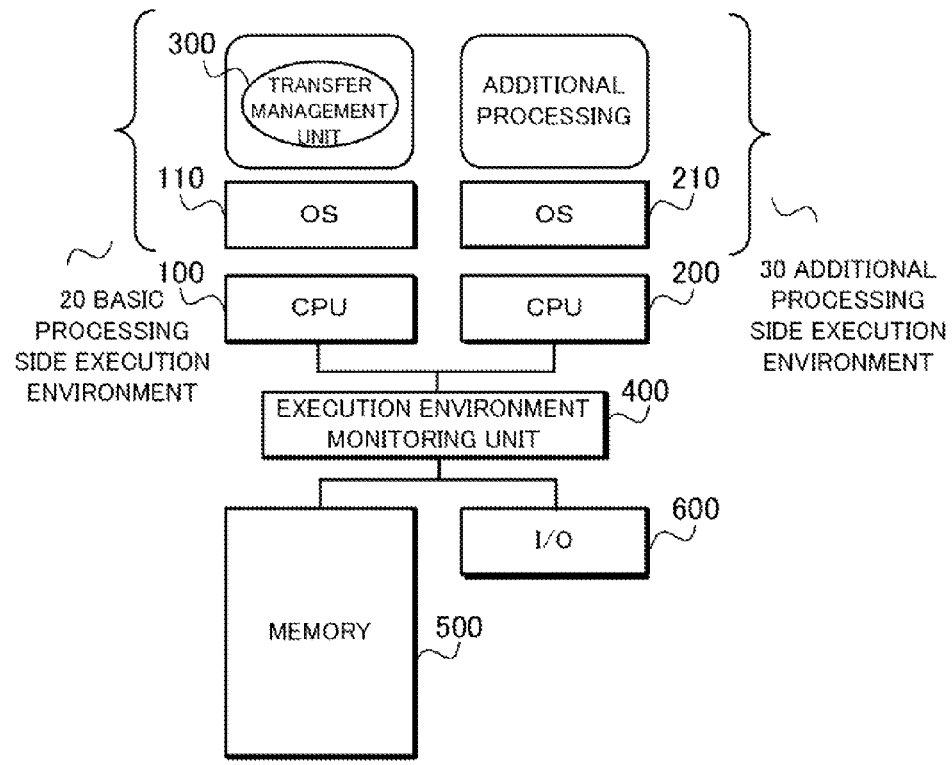
FIG. 1 is a block diagram showing an entire structure of an information processing device according to a first exemplary embodiment of the present invention.

FIG. 1 is a block diagram showing an entire structure of an information processing device according to a first exemplary embodiment of the present invention.

An information processing device 10 according to the first exemplary embodiment of the present invention has a multi-core or multi-processor structure which comprises a basic side CPU 100 as a first CPU forming an execution environment of basic processing (hereinafter referred to as a basic processing side execution environment 20) and an addition side CPU 200 as a second CPU forming an execution environment of additional processing (hereinafter referred to as an additional processing side execution environment 30).

Here, an environment including an OS 110 to be executed on the basic side CPU 100 and basic processing is defined as the basic processing side execution environment 20 and an environment including an OS 210 to be executed on the addition side CPU 200 and additional processing (software) is defined as the additional processing side execution environment 30.

In the first exemplary embodiment, description will be made of an information processing device by a stop transfer method which at the transfer (shifting or copying) of the additional processing side execution environment 30 from a certain information processing device to other information processing device, or at the transfer (shifting or copying) of other additional processing side execution environment 30 different from the working additional processing side execution environment 30 to a certain information processing device to cause the device to execute the environment, transfers a new additional processing side execution environment 30 after once explicitly stopping the working additional processing side execution environment 30.

On the basic side CPU 100, the operating system (OS) 110 is executed, and basic processing (various kinds of functions realized by hardware or software) originally incorporated into the information processing device is executed under the control of the OS 110.

On the addition side CPU 200, the operating system (OS) 210 is executed, and additional processing (additional functions realized by software) to be arbitrarily added to the information processing device and used or deleted is executed under the control of the OS 210.

The OS 110 on the basic side and the OS 210 on the addition side may be of the same OS or of a different OS in kind.

Provided in the basic processing side execution environment 20 is a transfer management unit 300 which is realized by hardware or software controlled by the OS 110 or autonomously operable without depending on the OS 110.

The basic side CPU 100 and the addition side CPU 200 are connected to each other to be communicable through an execution environment monitoring unit 400 and also connected to a memory 500 and an I/O interface 600 (an input/output interface with a network or other peripheral device).

The basic processing side execution environment 20 is an execution environment fixedly operable on the basic side CPU 100 without migration. More specifically, in response to a notification from the transfer management unit 300 or an external device, the environment realizes such processing that a user can not directly recognize as update of the addition side OS 210. While the description has been made of a case where there exists one basic processing side execution environment 20 with reference to FIG. 1, also possible is a structure where a plurality of basic processing side execution environments 20 exist with a plurality of the basic CPUs 100 and OSs 110. In this case, at least one transfer management unit 300 is required for one execution environment.

The additional processing side execution environment 30 is an execution environment which can be transferred (shifted or copied) between information processing devices, which operates on an assigned addition side CPU 200. The additional processing side execution environment 30 realizes additional processing (functions by various kinds of applications or the like executed on the information processing device) to be operated in practice by a user on the information processing device or an execution environment that can be directly recognized by a user on the information processing device.

The transfer management unit 300 provided in the basic processing side execution environment 20 has a function of controlling transfer (shifting or copying) of the additional processing side execution environment 30 in cooperation with the execution environment monitoring unit 400.

More specifically, in the processing of stopping (suspending) operation of the additional processing side execution environment 30 to upload the same, the transfer management unit 300 provides a function of instructing to suspend the additional processing side execution environment 30, a function of reading execution environment data from the memory 500, a function of transmitting the execution environment data to an external information processing device and a function of instructing to release setting by the execution environment monitoring unit 400. Input information to the transfer management unit 300 is execution environment data and output information is execution environment data and instruction information for releasing setting by the execution environment monitoring unit.

On the other hand, provided in the processing of downloading the additional processing side execution environment 30 to resume the same are a function of receiving external execution environment data, a function of developing received execution environment data into the memory 500, a function of instructing the execution environment monitoring unit 400 to set an environment and a function of starting the additional processing side execution environment 30. Input information to the transfer management unit 30 in this case is execution environment data and output information is execution environment data and information about environment setting by the execution environment monitoring unit 400.

Figure 2:
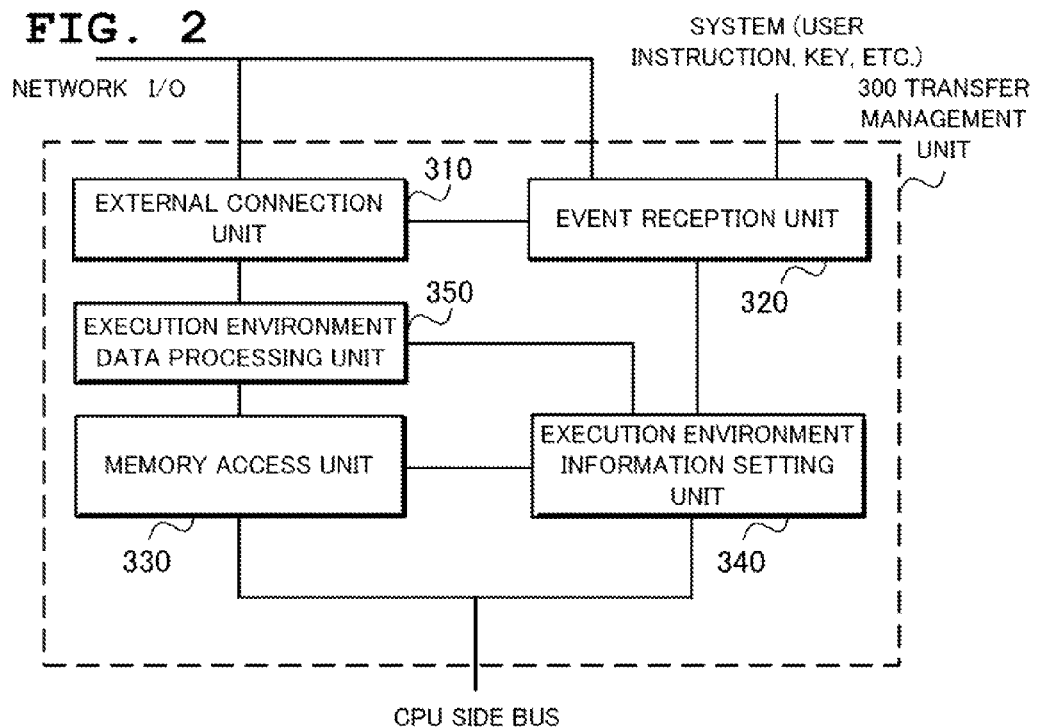
FIG. 2 is a block diagram showing a structure of a transfer management unit according to the first exemplary embodiment of the present invention.

With reference to FIG. 2, a structure of the transfer management unit 300 will be described.

The transfer management unit 300 is structured to comprise an external connection unit 310, an event reception unit 320, a memory access unit 330, an execution environment information setting unit 340 and an execution environment data processing unit 350.

The external connection unit 310 has a function of transferring execution environment data 1000 to other information processing device through the I/O interface 600 or accepting the execution environment data 1000 from other information processing device in the downloading or uploading processing of the execution environment data 1000.

The event reception unit 320 has a function of, upon an instruction on operation to suspend•upload, download or copy the additional processing side execution environment 30, instructing the external connection unit 310 to download the execution environment data 1000 or instructing the execution environment information setting unit 340 to suspend the additional processing side execution environment 30 or other function. The memory access unit 330 has a function of reading data from the memory 500 or writing data to the memory 500 upon a notification of a memory region from which read is to be made or to which write is to be made from the execution environment information setting unit 340 and other function.

The execution environment information setting unit 340 has a function of, upon an instruction from the event reception unit 320 to suspend the additional processing side execution environment 30, instructing the addition side CPU 200 to suspend the additional processing side execution environment 30 in operation and executing clock stop or clock supply, power stop or supply, or resetting or releasing the resetting of the addition side CPU.

The execution environment information setting unit 340 further has a function of instructing the execution environment monitoring unit 400 to release access control of the addition side CPU 200, a function of notifying the memory access unit 330 of a memory region from which read is to be made or to which write is to be made, a function of notifying the execution environment data processing unit 350 or the external connection unit 310 of such information as an assigned physical address/region size, and a function of executing analysis based on the information of a header part 1100 of the execution environment data 1000.

The execution environment data processing unit 350 has a function of generating the execution environment data 1000 from such information as an assigned physical address/region size notified by the execution environment information setting unit 340 and from data corresponding to the additional processing side execution environment 30 transmitted from the memory access unit 330.

The execution environment monitoring unit 400 provides a function of controlling an access to the memory 500 from the addition side CPU 200.

In a case where execution environment data of the additional processing side execution environment 30 is downloaded and written to the memory 500, when an address of a memory region to which the execution environment data is written differs from an address of a memory region of an information processing device from which the upload is made, the execution environment monitoring unit 400 controls an access from the addition side CPU 200 such that the address of the memory region to which the downloading is made and the address of the memory region from which the uploading is made match with each other.

More specifically, provided is a function of monitoring, in the processing of stopping (suspending) and uploading the additional processing side execution environment 30, an access from the basic processing side execution environment 20 and the additional processing side execution environment 30 based on CPU management data which will be described later. To an unauthorized access against setting information set in the CPU management data, notify an error to an execution environment requesting the access. In this case, input information to the execution environment monitoring unit 400 is environment setting information and output information is error information. Also provided is a function of monitoring an access from an execution environment according to the CPU management data in the processing of downloading and resuming the additional processing side execution environment 30. To an unauthorized access against setting information set in the CPU management data, notify an error to an execution environment requesting the access. In this case, input information to the execution environment monitoring unit 400 is setting information and output information is error information. Structure of the execution environment monitoring unit 400 will be described with reference to FIG. 3.

The execution environment monitoring unit 400 comprises an access control unit 410 formed of a CPU filtering unit 411 and a CPU management data storage unit 412.

The CPU filtering unit 411 provides a filtering function of, upon receiving an access request from a certain basic side CPU 100 or addition side CPU 200 through a system bus, determining whether to refuse the access request based on CPU management data 421 read from the CPU management data storage unit 412.

Figures 3, 4:
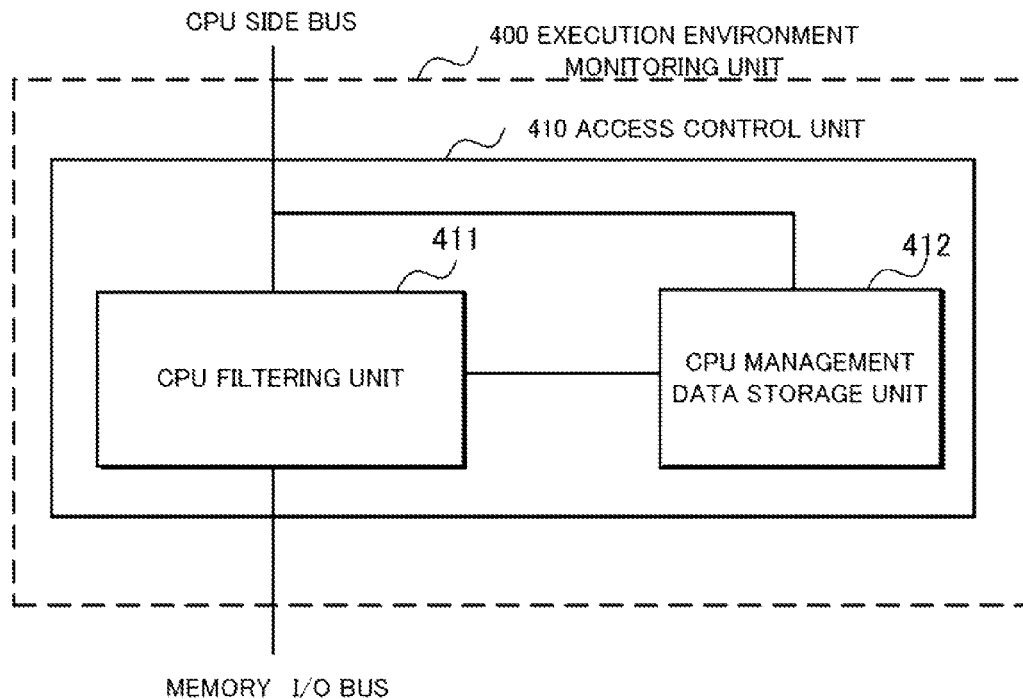
FIG. 3 is a block diagram showing a structure of an execution environment monitoring unit according to the first exemplary embodiment of the present invention.
FIG. 4 is a diagram showing an example of a structure of CPU management data to be stored in a CPU management data storage unit according to the first exemplary embodiment of the present invention.

FIG. 4 shows an example of a structure of CPU management data 421 to be stored in the CPU management data storage unit 412.

Set in the CPU management data 421 is an address range accessible to each region of the memory 500 by the basic side CPU 100 and the addition side CPU 200 (start address and end address) as illustrated in the figure.

"R" indicated in an allowed bit represents readable and "R/W" represents readable and writable.

Figure 5:
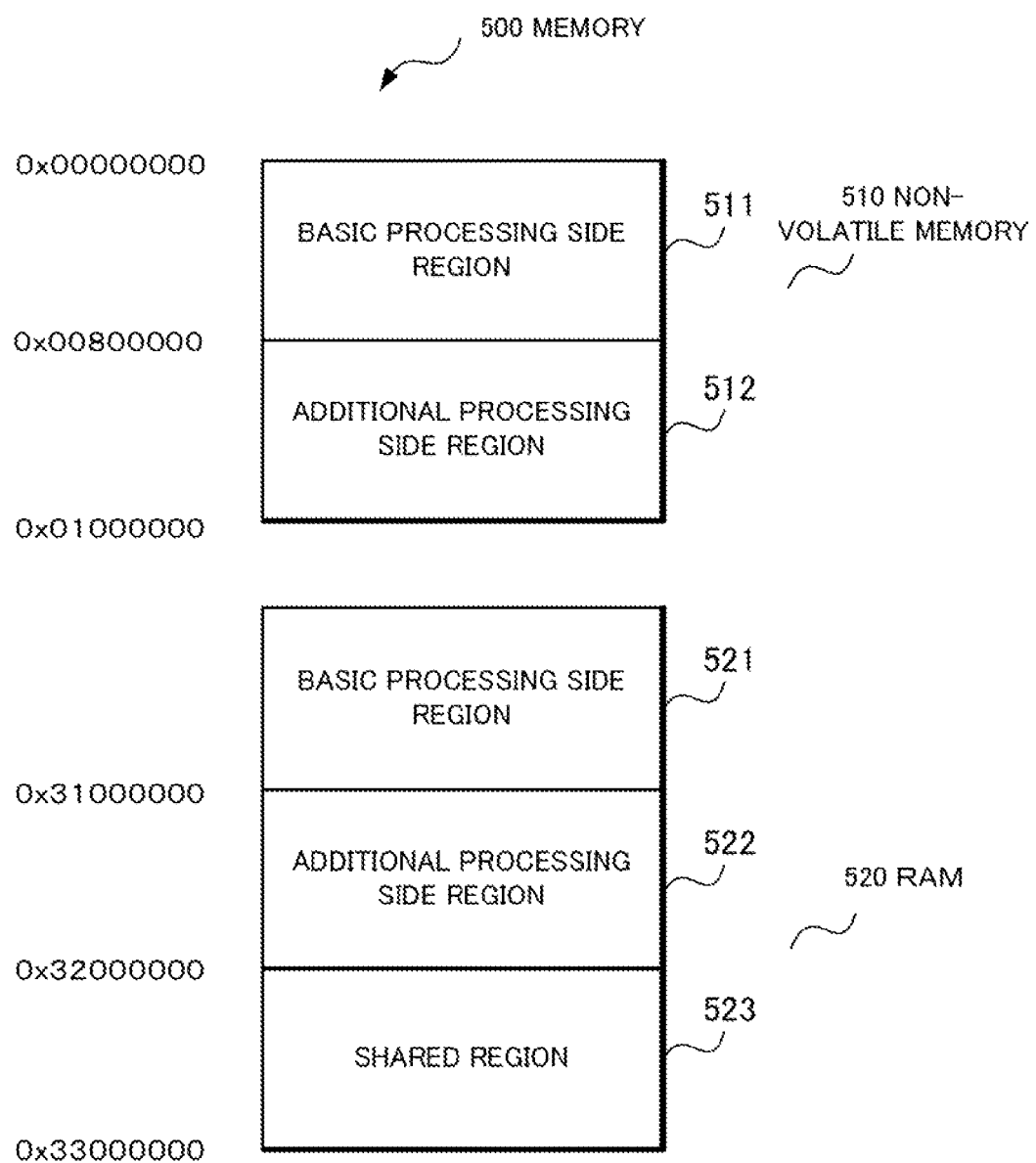
FIG. 5 is a block diagram showing an example of a structure of a memory according to the first exemplary embodiment of the present invention.

Set by the CPU management data 421 are such contents as, for example, in the addition side CPU 200, a region of a non-volatile memory and a RAM of the memory 500 assigned to the additional processing side is accessible and a first half of a shared memory region is readable only and the latter half is readable and writable. FIG. 5 is a diagram showing a memory constitution of the memory 500. As shown in the figure, the memory 500 is formed of a non-volatile memory 510 and a RAM (Random Access Memory) 520.

Provided in the non-volatile memory 510 are a basic processing side region 511 and an additional processing side region 512.

Provided in the RAM 520 are a basic processing side region 521, an additional processing side region 522 and a shared region 523.

Figure 6:
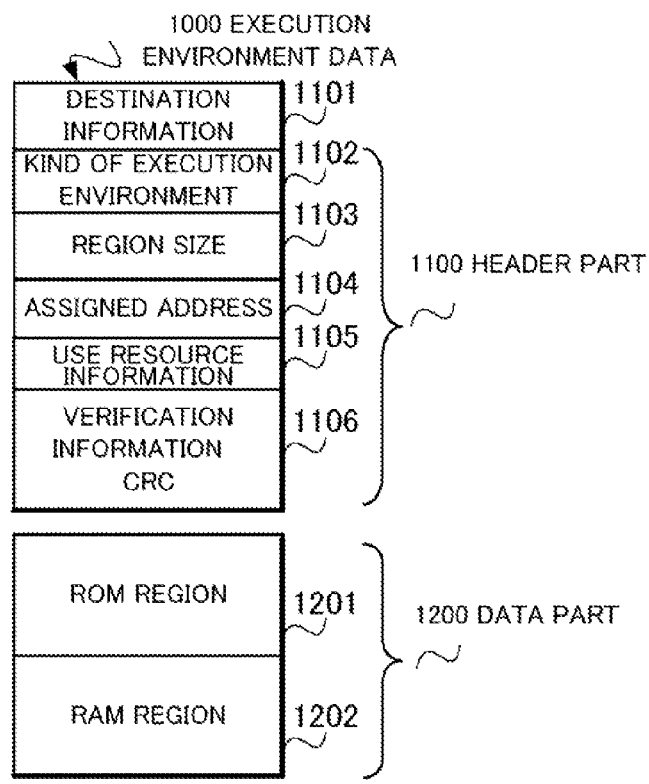
FIG. 6 is a diagram showing a structure of execution environment data for use in transfer of an additional processing side execution environment according to the first exemplary embodiment of the present invention.

FIG. 6 is a diagram showing a constitution of the execution environment data 1000 for use in transferring the additional processing side execution environment 30.

The execution environment data 1000 is formed of a header part (header information) 1100 and a data part 1200.

Stored in the header part 1100 is environment constitution information of the additional processing side execution environment 30.

Included as the environment constitution information are destination information 1101, execution environment kind information 1102, region size information 1103, assigned address information 1104, execution environment resource information 1105 and verification information 1106.

The destination information 1101 is information indicative of a transfer destination of the execution environment data 1000. The execution environment kind information 1102 is information indicative of a kind of the additional processing side execution environment 30 including a kind of the OS 210, a file system or the like on the addition side.

The region size information 1103 is information indicative of a size of the additional processing side region 511 of the non-volatile memory 510, and the additional processing side region 522 and the shared region 523 of the RAM 520. The assigned address information 1104 is information indicating which physical address of the memory 500 the data of the additional processing side execution environment 30 uses.

The execution environment resource information 1150 is information indicating which resource (I/O interface or the like) the additional processing side execution environment 30 uses. The verification information 1106 is information for verifying existence/non-existence of alteration of the data of the additional processing side execution environment 30.

Stored in the data part 1200 are various kinds of programs including the addition side OS 200 and application software operable in the additional processing side execution environment 30, and data handled by these programs.

The data part 1200 includes non-volatile side data 1201 to be stored in the additional processing side region 512 of the non-volatile memory 510 and RAM side data 1202 to be stored in the additional processing side region 522 of the RAM 520.

(Description of Operation)

In the following, description will be made of operation of transfer and switching of the additional processing side execution environment 30 executed by the information processing device 10 according to the first exemplary embodiment.

(1) Shifting Processing (Suspend•Upload) of the Additional Processing Side Execution Environment 30

Figure 7:
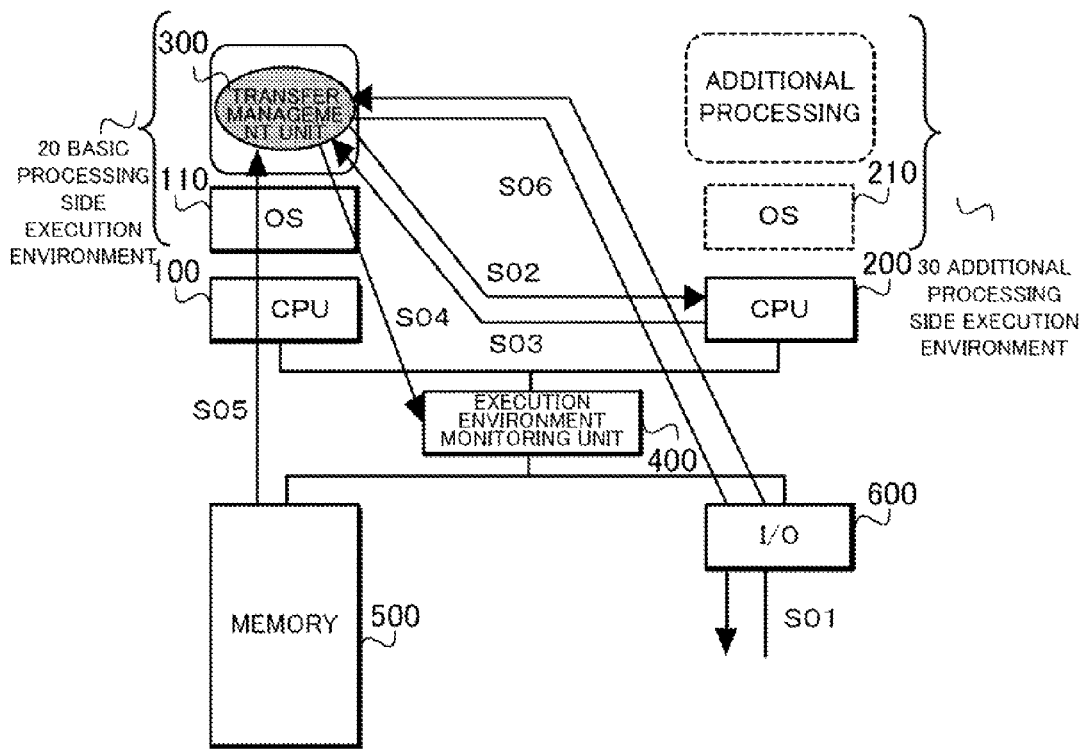
FIG. 7 is a diagram showing shifting processing (suspend•upload) of the additional processing side execution environment by a stop transfer method according to the first exemplary embodiment of the present invention.

Description will be made of shifting processing (suspend•upload) of the additional processing side execution environment 30 by the stop transfer method according to the first exemplary embodiment with reference to FIG. 7.

The shifting processing (suspend•upload) is processing of transferring the additional processing side execution environment 30 operating on the information processing device 10 to other external information processing device by shifting (uploading).

It is, for example, the processing of transferring the additional processing side execution environment 30 being currently in operation on the information processing device 10 to other external information processing device by shifting before incorporation (downloading) of other additional processing side execution environment 30 than the working additional processing side execution environment 30.

Step S01: Instruction information related to the shifting processing is notified to the transfer management unit 300 through the I/O interface 600 by a user's instruction or a key event. Step S02: Upon receiving instruction information for suspending•uploading, the transfer management unit 300 instructs the addition side CPU 200 to suspend (stop) the additional processing side execution environment 30 in operation.

Upon receiving the suspend instruction, the addition side CPU 200 stops the operation of the OS 210 and the additional processing which form the additional processing side execution environment 30.

Step S03: The transfer management unit 300 accepts completion of suspending from the addition side CPU 20. Step S04: The transfer management unit 300 instructs the execution environment monitoring unit 400 to release setting of a region for use by the addition side CPU 200.

Responsively, the execution environment monitoring unit 400 releases setting contents set for allowing the addition side CPU 200 to access a region of the memory 500 for the additional processing side execution environment 30.

Step S05: The transfer management unit 300 reads data corresponding to the additional processing side execution environment 30 from the memory 500. Step S06: With the read data as the data part 1200, the transfer management unit 300 generates the execution environment data 1000 by adding the header part 1100 to the data part 1200 and uploads the data into other information processing device 10 as a transmission destination through the I/O interface 600.

Figure 8:
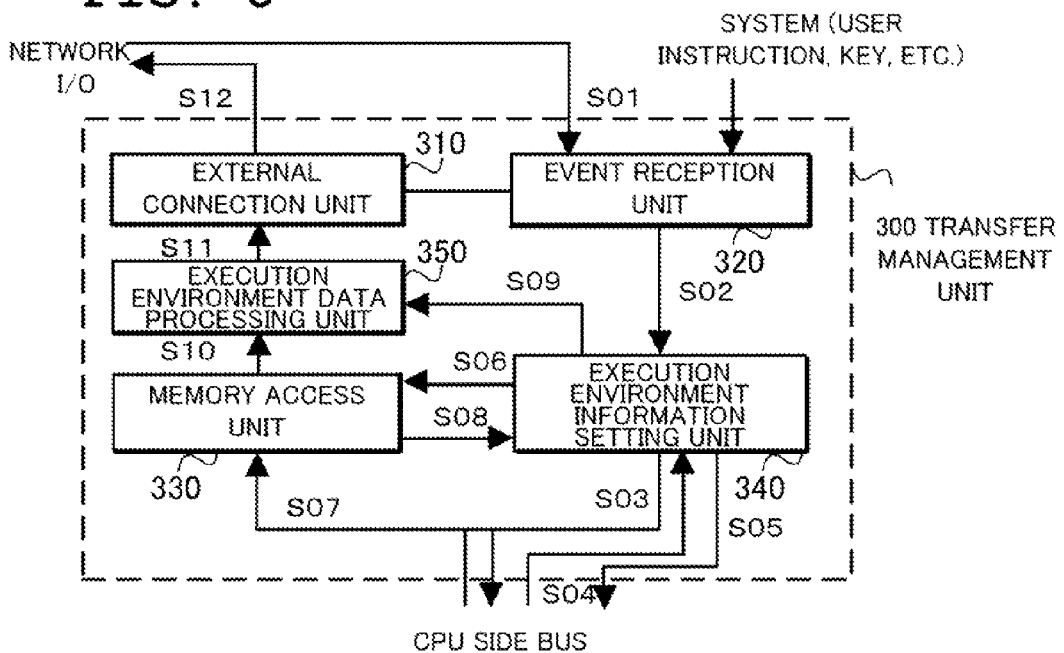
FIG. 8 is a diagram showing detailed operation of the transfer management unit in the shifting processing (suspend•upload) of the additional processing side execution environment by the stop transfer method according to the first exemplary embodiment of the present invention.

It is also possible at Step S06 to execute one-to-N uploading by designating a plurality of information processing devices as a transmission destination. Next, description will be made of detailed operation of the transfer management unit 300 in the above-described shifting processing (suspend•upload) with reference to FIG. 8.

Step S01: The event reception unit 320 receives an instruction on operation of suspending•uploading an execution environment in operation through a user instruction/key event or the network•I/O interface 600.

Step S02: The event reception unit 320 instructs the execution environment information setting unit 340 to suspend an execution environment in operation.

Step S03: The execution environment information setting unit 340 instructs the addition side CPU 200 to suspend the additional processing side execution environment 30 in operation through an inter-processor interruption.

Step S04: The execution environment information setting unit 340 accepts a suspension completion notification through the inter-processor interruption. Step S05: The execution environment information setting unit 340 executes clock stop, power supply stop and resetting of the addition side CPU. Furthermore, instruct the execution environment monitoring unit 400 to release access control of the addition side CPU 200.

Step S06: The execution environment information setting unit 340 notifies the memory access unit 330 of a memory region from which read is to be made.

Notified here is a region of the memory 500 in which data corresponding to the additional processing side execution environment 30 is stored.

More specifically, notified as a reading target out of the memory 500 constitution shown in FIG. 5 are the region 511 for an additional execution environment in the non-volatile memory 510, and the region 522 for an additional execution environment and the shared region 523 in the RAM 520. Step S07: The memory access unit 330 reads data stored in each notified region of the memory 500. Step S08: The memory access unit 330 notifies the execution environment information setting unit 340 of the completion of reading from the relevant region. Step S09: The execution environment information setting unit 340 notifies environment constitution information of the additional processing side execution environment 30 such as assigned physical address and region size to the execution environment data processing unit 350. Step S10: The memory access unit 330 transmits the data corresponding to the additional processing side execution environment 30 which is read from the memory 500 to the execution environment data processing unit 350. Step S11: With the information from the execution environment information setting unit 340 as the header part 1100 and the data from the memory access unit 330 as the data part 1200, the execution environment data processing unit 350 generates the execution environment data 1000 and sends the same to the external connection unit 310.

Step S12: The external connection unit 310 uploads the execution environment data 1000 from the execution environment data processing unit 350 into other information processing device 10 as a transmission destination through the network•I/O interface 600.

(2) Shifting Processing (Download•Resume) of the Additional Processing Side Execution Environment 30

Figure 9:
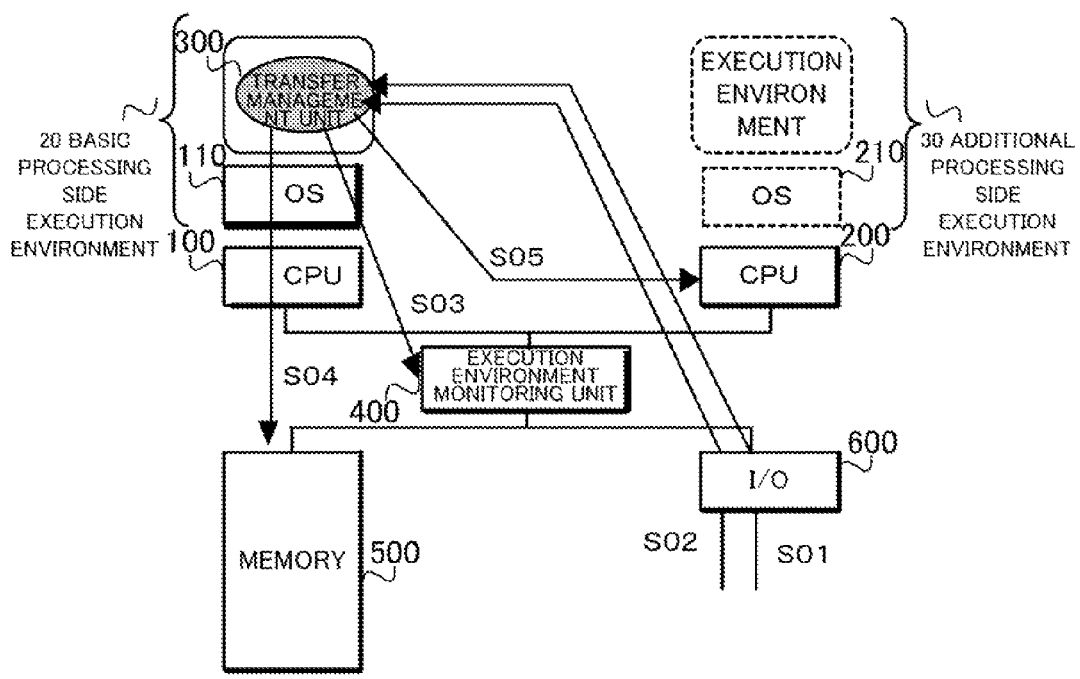
FIG. 9 is a diagram showing shifting processing (download•resume) of the additional processing side execution environment by the stop transfer method according to the first exemplary embodiment.

Description will be made of the shifting processing (download•resume) of the additional processing side execution environment unit 30 by the stop transfer method according to the first exemplary embodiment with reference to FIG. 9.

The downloading•resuming operation is to download the additional processing side execution environment 30 uploaded to other information processing device to execute the same on the addition side CPU 200.

Step S01: Instruction information related to downloading of the execution environment data 1000 which indicates the additional processing side execution environment 30 (by a user instruction or a key event from a user of the information processing device 10) is notified to the transfer management unit 300 by other information processing device 10 of the opposite party through the I/O interface 600.

Step S02: The transfer management unit 300 of the information processing device 10 having received the notification executes the processing of downloading the execution environment data 1000 designated by the instruction information.

Step S03: The transfer management unit 300 issues an instruction based on the information included in the header part 1100 of the execution environment data 1000 to the execution environment monitoring unit 400.

Step S04: The transfer management unit 300 writes the data part 1200 of the execution environment data 1000 into the memory 500.

More specifically, write the data part 1200 into a region indicated by the assigned address information 1104 of the header part 1100 out of the additional processing side regions of the memory 500. Step S05: The transfer management unit 300 executes start-up of the addition side CPU 200.

Figure 10:
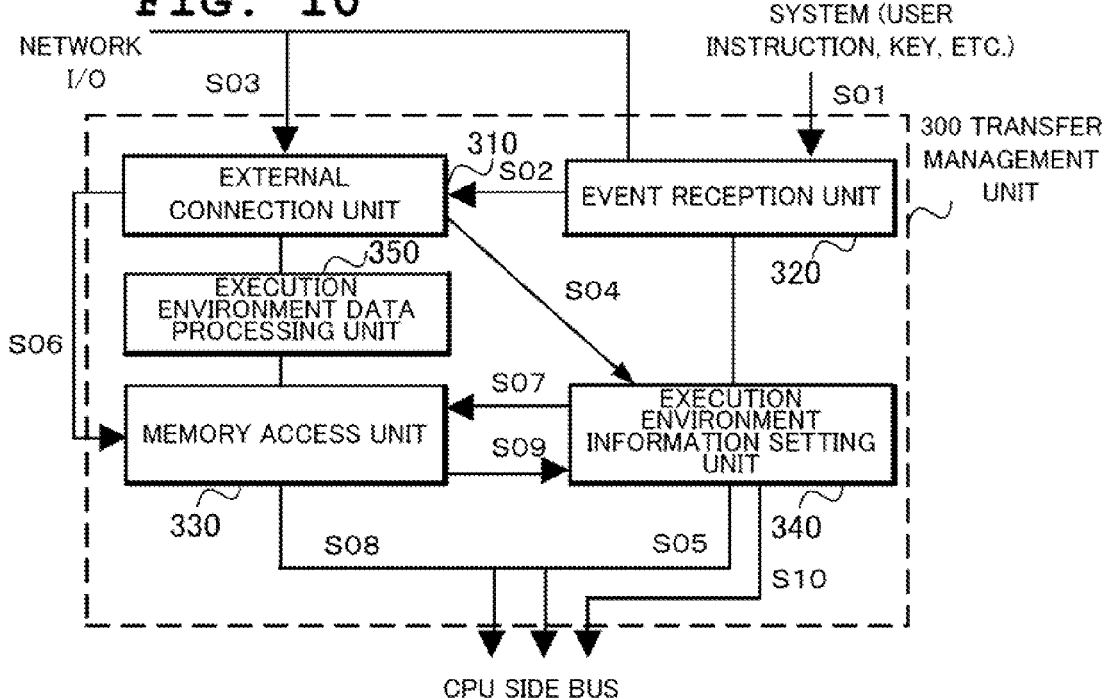
FIG. 10 is a diagram showing detailed operation of the transfer management unit in the shifting processing (download•resume) of the additional processing side execution environment by the stop transfer method according to the first exemplary embodiment of the present invention.

Next, description will be made of detailed operation of the transfer management unit 300 in the above-described shifting processing (downloading•resuming) with reference to FIG. 10.

Step S01: The event reception unit 320 of the transfer management unit 300 receives instruction information related to downloading of certain execution environment data 1000 (by a user instruction or a key event) which forms the additional processing side execution environment 30 from other information processing device 10 through the I/O interface 600.

Step S02: The event reception unit 320 instructs the external connection unit 310 to download the execution environment data 1000.

The execution environment data 1000 having destination information which unitarily identifies the information processing device 10 that executes the downloading•resuming operation in the header part 1100 is designated as a downloading target.

Step S03: The external connection unit 310 downloads the execution environment data 1000 designated. Step S04: The external connection unit 310 transfers the header part 1100 of the downloaded execution environment data 1000 to the execution environment information setting unit 340.

Step S05: The execution environment information setting unit 340 analyzes information of the header part 1100 and issues an instruction based on the information to the execution environment monitoring unit 400.

In this analysis, for example, based on the region size information 1103 of the header part 1100, a region of the memory 500 as a writing destination is determined based on the assigned address information 1104 by checking whether necessary region of the non-volatile memory 510 and region of the RAM 520 can be ensured or the like.

Then, instruct the execution environment monitoring unit 400 to change the setting such that the addition side CPU 200 is allowed to access the determined region of the memory 500.

Step S06: The external connection unit 310 transfers the data part 1200 of the downloaded execution environment data 1000 to the memory access unit 330.

Step S07: The execution environment information setting unit 340 notifies the memory access unit 330 of the region of the memory 500 as a writing destination.

Step S08: The memory access unit 330 writes the data part 1200 into the notified region of the memory 500. Step S09:

The memory access unit 330 notifies the completion of the write to the memory 500 to the execution environment information setting unit 340.

Step S10: The execution environment information setting unit 340 supplies power/clock of the addition side CPU 200 and releases resetting.

As a result, the additional processing and the OS 210 are incorporated into the addition side CPU 200 to form the additional processing side execution environment 30.

(3) Copying Processing of the Additional Processing Side Execution Environment 30

Figure 11:
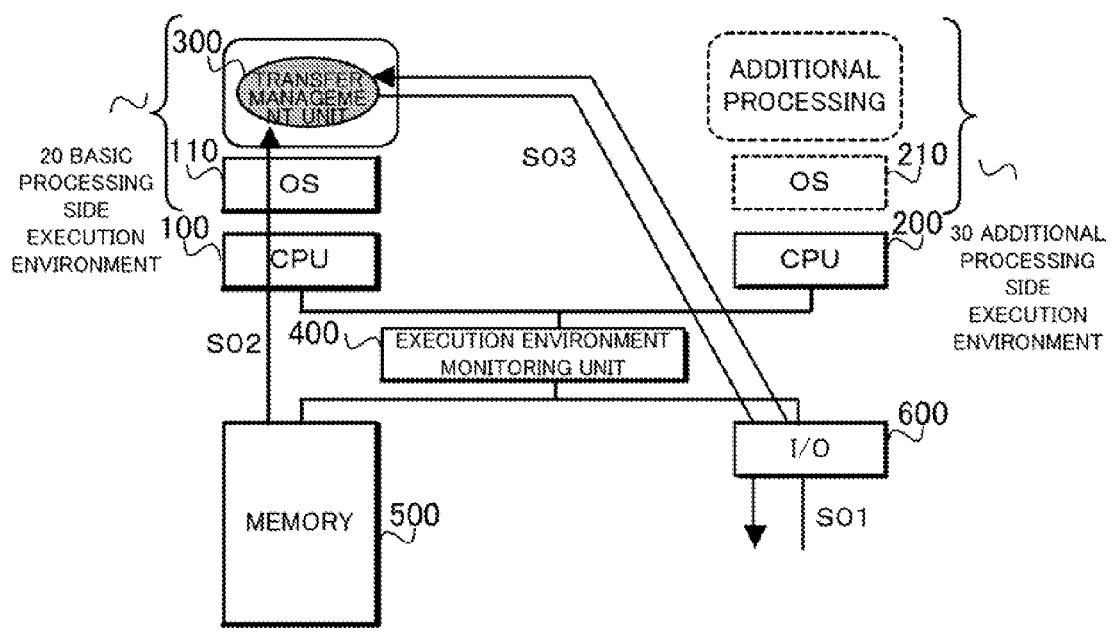
FIG. 11 is a diagram showing copying processing of the additional processing side execution environment by the stop transfer method according to the first exemplary embodiment of the present invention.

Description will be made of the copying processing of the additional processing side execution environment 30 by the stop transfer method according to the first exemplary embodiment with reference to FIG. 11.

The copying processing is, when the additional processing side execution environment 30 being currently operating on the information processing device 10 is to be used by other information device while leaving the same, to copy the execution environment data 1000 of the working additional processing side execution environment 30 onto other information processing device.

Step S01: Instruction information related to copying is notified to the transfer management unit 300 by a user instruction or a key event through the I/O interface 600.

Step S02: The transfer management unit 300 reads data corresponding to the additional processing side execution environment 30 operating on the addition CPU 210 which is designated by the instruction information from the memory 500. Step S03: With the data read from the memory 500 as the data part 1200, the transfer management unit 300 generates the execution environment data 1000 by applying the header part 1100 to the data part 1200 and copies the generated data onto the information processing device as the opposite party through the I/O interface 600.

It is also possible to make a one-to-N copy at step S03 by designating a plurality of information processing devices as a transmission destination.

Next, description will be made of detailed operation of the transfer management unit 300 in the above-described copying processing with reference to FIG. 12.

Step S01: The event reception unit 320 receives an instruction on the operation of copying an execution environment in operation through a user instruction•key event or the network•I/O interface 600. Step S02: The event reception unit 320 instructs the execution environment information setting unit 340 to suspend the additional processing side execution environment 30 in operation.

Step S03: The execution environment information setting unit 340 instructs the addition side CPU 200 to suspend the additional processing side execution environment 30 in operation through an inter-processor interruption.

Step S04: The execution environment information setting unit 340 accepts a suspension completion notification through the inter-processor interruption. Step S05: The execution environment information setting unit 340 notifies the memory access unit 330 of a memory region from which read is to be made. Notified here is a region of the memory 500 which stores data corresponding to the additional processing side execution environment 30.

More specifically, notified as a reading target out of the memory 500 constitution shown in FIG. 5 are the region 511 for an additional execution environment in the non-volatile memory 510, and the region 522 for an additional execution environment and the shared region 523 in the RAM 520. Step S06: The memory access unit 330 reads data stored in each notified region of the memory 500. Step S07: The memory access unit 330 notifies the execution environment information setting unit 340 of the completion of reading from the relevant region. Step S08: The execution environment information setting unit 340 notifies environment constitution information of the additional processing side execution environment 30 such as assigned physical address and region size to the execution environment data processing unit 350. Step S09: The memory access unit 330 transmits the data corresponding to the additional processing side execution environment 30 which is read from the memory 500 to the execution environment data processing unit 350.

Step S10: With the information from the execution environment information setting unit 340 as the header part 1100 and the data from the memory access unit 330 as the data part 1200, the execution environment data processing unit 350 generates the execution environment data 1000 and sends the same to the external connection unit 310. Step S11: The external connection unit 310 copies the execution environment data 1000 from the execution environment data processing unit 350 onto the information processing device as the opposite party through the network or the I/O interface 600.

In the above-described copying processing, because the additional processing side execution environment 30 of a certain information processing device will be copied including the environment constitution information as it is onto an information processing device of the opposite party, no such processing as changing of setting to the execution environment monitoring unit 400 is required unlike the case of the downloading processing.

Effects of the First Exemplary Embodiment

Thus structured and operating information processing device according to the first exemplary embodiment of the present invention attains the following effects.

(1) Transferring the additional processing side execution environment 30 including an OS of a predetermined information processing device to other information processing device enables a plurality of information processing devices to share the same additional processing side execution environment 30 with ease.

It is, for example, possible to share the same execution environment by a plurality of terminals by transferring the additional processing side execution environment 30 of an information processing device used by a user to other information processing device as it is by the copying processing.

In particular, since the execution environment management unit 300 generates execution environment data which stores environment constitution information related to a state/ environment of the additional processing side execution environment 30, and executes downloading and uploading based on the execution environment data, a plurality of information processing devices are allowed to share the additional processing side execution environment without requiring a large amount of memory while maintaining basic performance of the execution environment.

(2) While transfer of an execution environment using a virtual machine employed so far causes basic performance such as a processing rate of an execution environment to be degraded and a large amount of non-volatile memory to be required for shifting an environment, the first exemplary embodiment enables basic performance of an execution environment to be maintained without requiring a large amount of memory for transfer because the additional processing side execution environment 30 operating on the addition side CPU 200 having a multi-processor structure is transferred to other information processing device by shifting or copying.

(3) In addition, while transfer using a virtual machine requires new development of software (device driver etc.) for specializing in a virtual machine, the present exemplary embodiment needs none of new development of software (device driver etc.) because it is structured to transfer the additional processing side execution environment 30 operating on the addition side CPU as execution environment data.

(4) In the on-line environment, by downloading the additional processing side execution environment 30 from other device, operating the additional processing side execution environment 30 incorporated under the off-line environment to execute data processing, and returning again to the on-line environment to upload the additional processing side execution environment to other device and restore the same, use of an information processing device maintaining security is enabled.

Second Exemplary Embodiment

Description of Structure

Next, description will be made of a structure of an information processing device according to a second exemplary embodiment of the present invention with reference to FIG. 13.

Entire structure of the information processing device 10 according to the second exemplary embodiment of the present invention is the same as the structure of the above-described first exemplary embodiment and has a multi-core or multi-processor structure comprising the basic side CPU 100 as a first CPU forming an execution environment of basic processing (hereinafter, referred to as the basic processing side execution environment 20) and the addition side CPU 200 as a second CPU forming an execution environment of additional processing (hereinafter, referred to as the additional processing side execution environment 30) as shown in FIG. 13.

In FIG. 13, the same or corresponding components as or to those of the first exemplary embodiment shown in FIG. 1 are identified by the same reference numerals.

It is also the same as the first exemplary embodiment in defining an environment including the OS 110 to be executed on the basic side CPU 100 and basic processing as the basic processing side execution environment 20 and defining an environment including the OS 210 to be executed on the addition side CPU 200 and additional processing (software) as the additional processing side execution environment 30.

The second exemplary embodiment realizes a non-stop transfer method of, at the time of transfer of the additional processing side execution environment 30 from a certain information processing device to an information processing device of the opposite party (hereinafter referred to as non-stop switching transmission) to receive and execute the transferred additional processing side execution environment 30 at the information processing device (hereinafter referred to as non-stop switching reception), newly transferring the additional processing side execution environment 30 while operating the additional processing side execution environment 30 of the information processing device (substantially without stopping).

In practice, the operation is not stopped at all but stopped in a small unit of time which will affect no operation of an execution environment or which will affect the same very slightly, so that transmission and reception of the additional processing side execution environment 30 is realized without interrupting operation of the information processing device.

Also the same as the first exemplary embodiment is that the operating system (OS) 110 is executed on the basic side CPU 100 and the operating system (OS) 210 is executed on the addition side CPU 200. Also in the present exemplary embodiment, the basic side OS 110 and the addition side OS 210 may be the same in kind of OS or have a different kind of OS.

Provided in the basic processing side execution environment 20 is a transfer management unit 1300 which is realized by hardware or software controlled by the OS 110 or is autonomously operable without depending on the OS 110.

The basic side CPU 100 and the addition side CPU 200 are connected with each other to be communicable through an execution environment monitoring unit 1400 and also connected to the memory 500 and the I/O interface 600 (input/output interface with a network or other peripheral device).

While the second exemplary embodiment shown in FIG. 13 has been described also with respect to a case where there is one basic processing side execution environment 20, it may be structured to have a plurality of basic processing side execution environments 20 comprising a plurality of the basic CPUs 100 and OSs 110. In this case, one transfer management unit 1300 is required for at least one execution environment.

The additional processing side execution environment 30 is an execution environment which can be transmitted/received between information processing devices and is operable on an assigned addition side CPU 200. The additional processing side execution environment 30 realizes additional processing to be operated in practice by a user on an information processing device (a function provided by various kinds of applications executed on the information processing device) or an execution environment which can be directly recognized by the user on the information processing device.

The transfer management unit 1300 provided in the basic processing side execution environment 20 has a function of controlling transmission and reception of the additional processing side execution environment 30 in cooperation with the execution environment monitoring unit 1400.

More specifically, in the processing of the non-stop switching transmission of the additional processing side execution environment 30, the transfer management unit 1300 provides a function of instructing the additional processing side execution environment 30 to interrupt, a function of reading data of the additional processing side execution environment 30 from the memory 500, a function of externally transmitting read data, a function of instructing on start of monitoring of updated data, a function of reading updated data, a function of externally transmitting updated data and a function of instructing the execution environment monitoring unit 1400 to release setting.

Input information to the transfer management unit 300 in this case is execution environment data, updated data and a notification of an overflow of updated data and output information is execution environment data, additional updated data and instruction information for releasing the setting by the execution environment monitoring unit 1400. In addition, in the processing of receiving the additional processing side execution environment 30, provided are a function of receiving external execution environment data, a function of developing received execution environment data into the memory 500, a function of instructing the execution environment monitoring unit 1400 to set an environment and a function of starting the additional processing side execution environment 30.

Input information to the transfer management unit 1300 in this case is execution environment data and updated data and output information is execution environment data, updated data and information about environment setting by the execution environment monitoring unit 1400.

Figure 14:
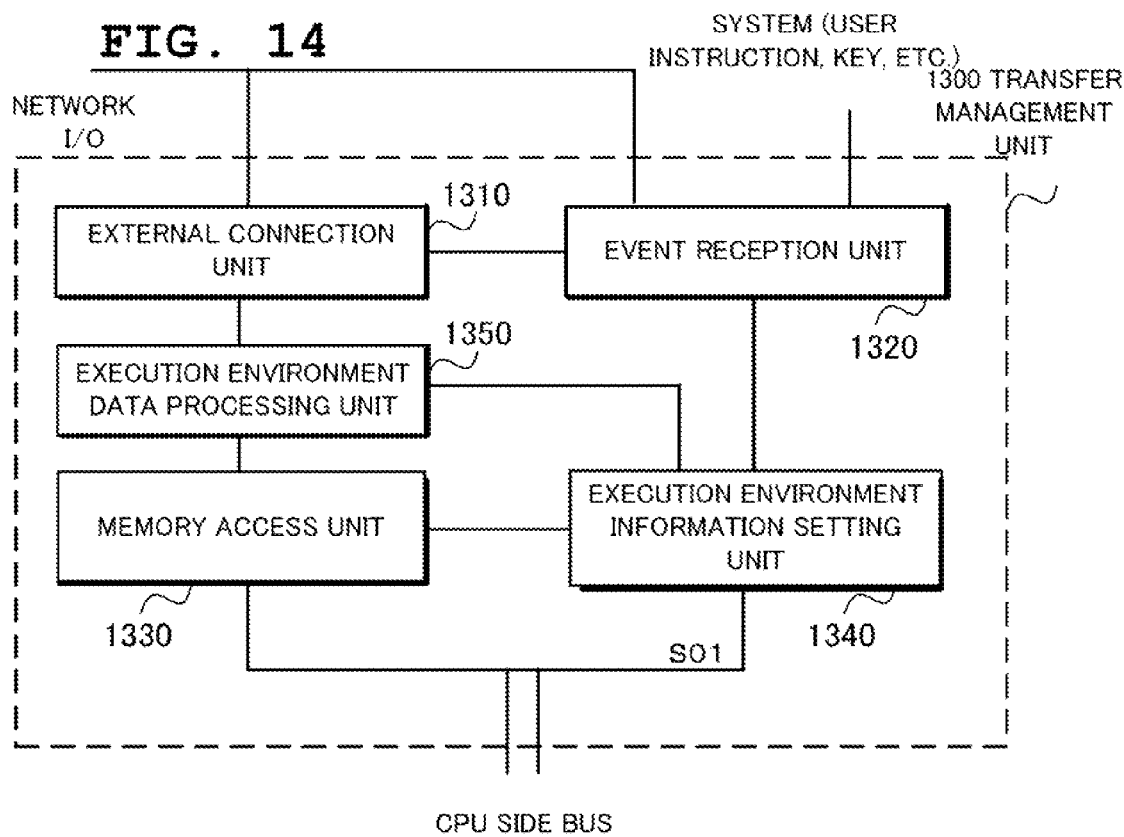
FIG. 14 is a block diagram showing a structure of a transfer management unit according to the second exemplary embodiment of the present invention.

With reference to FIG. 14, a structure of the transfer management unit 1300 will be described.

The transfer management unit 1300 is structured to comprise an external connection unit 1310, an event reception unit 1320, a memory access unit 1330, an execution environment information setting unit 1340 and an execution environment data processing unit 1350.

The external connection unit 1310 has a function of, in the processing of transmitting or receiving the execution environment data 1000, transmitting the execution environment data 1000 to other information processing device or receiving the execution environment data 1000 from other information processing device through the I/O interface 600.

The event reception unit 1320 has a function of, upon receiving an instruction on non-stop switching transmission or non-stop switching reception of the additional processing side execution environment 30, instructing the external connection unit 1310 to receive the execution environment data 1000 or instructing the execution environment information setting unit 1340 to suspend the additional processing side execution environment 30 and other functions. The memory access unit 1330 has a function of reading data from the memory 500 or writing data to the memory 500 in response to a notification of a memory region from which read is made or to which write is made by the execution environment information setting unit 1340 and other functions.

The execution environment information setting unit 1340 has a function of, in response to an instruction from the event reception unit 1320 to suspend the additional processing side execution environment 30, instructing the addition side CPU 200 to suspend the additional processing side execution environment 30 in operation and executing clock stop, clock supply, power stop or supply, and resetting or releasing of resetting of the addition side CPU.

The execution environment information setting unit 1340 has a function of instructing the execution environment monitoring unit 1400 to release access control of the addition side CPU 200, a function of notifying the memory access unit 1330 of a memory region from which read is made and to which write is made, a function of notifying the execution environment data processing unit 1350 or the external connection unit 1310 of environment constitution information such as assigned physical address and region size, and a function of executing analysis based on environment constitution information of the header part 1100 of the execution environment data 1000.

The execution environment data processing unit 1350 has a function of generating the execution environment data 1000 from such environment constitution information as assigned physical address or region size which is notified from the execution environment information setting unit 340 and data corresponding to the additional processing side execution environment 30 transmitted from the memory access unit 1330.

The execution environment monitoring unit 1400 provides a function of filtering an access from the addition side CPU 200 to the memory 500 and a function of monitoring access update.

In a case where execution environment data of the additional processing side execution environment 30 is downloaded and written to the memory 500, when an address of a memory region to which the execution environment data is written differs from an address of a memory region of an information processing device as an uploading source, the execution environment monitoring unit 1400 controls an access from the addition side CPU 200 such that the address of the memory region to which downloading is made and the address of the memory region from which uploading is made match with each other.

More specifically, in the processing of transmitting execution environment data of the additional processing side execution environment 30, provided are a function of monitoring an access from the basic processing side execution environment 20 and the additional processing side execution environment 30 based on CPU management data which will be described later and a function of monitoring update of data to notify the transfer management unit 1300 of an overflow of updated data in response to an update monitoring request from the transfer management unit 1300.

With respect to an unauthorized access against setting information set at the CPU management data, notify an error to an execution environment requesting the access. Input information to the execution environment monitoring unit 1400 in this case is a request for environment setting information or update monitoring and output information is error information or a notification of an overflow of updated data. In addition, in the processing of receiving execution environment data of the additional processing side execution environment 30, provided is a function of monitoring an access from an execution environment according to CPU management data. With respect to an unauthorized access against setting information set at the CPU management data, notify an error to an execution environment requesting the access. Input information to the execution environment monitoring unit 1400 in this case is setting information and output information is error information.

Figure 15:
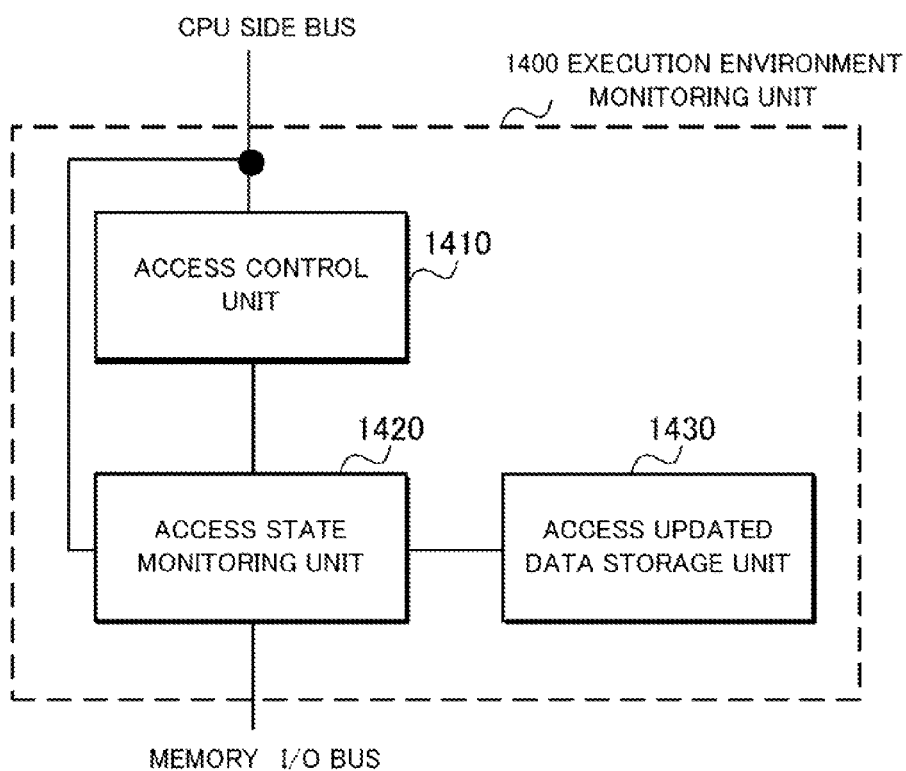
FIG. 15 is a block diagram showing a structure of an execution environment monitoring unit according to the second exemplary embodiment of the present invention.

With reference to FIG. 15, a structure of the execution environment monitoring unit 1400 will be described.

The execution environment monitoring unit 1400 is structured to comprise an access control unit 1410, an access state monitoring unit 1420 and an access updated data storage unit 1430.

Similarly to the access control unit 410 of the first exemplary embodiment, the access control unit 1410 comprises the CPU filtering unit 411 and the CPU management data storage unit 412.

The CPU filtering unit 1411 provides a filtering function of, upon receiving an access request from the basic side CPU 100 or the addition side CPU 200 through the system bus, determining whether to refuse the access request based on the CPU management data 1421 read from the CPU management data storage unit 1412.

Since the CPU management data 1421 is completely the same as the CPU management data 420 stored in the CPU management data storage unit 412 shown in FIG. 4, no description will be made thereof.

The access state monitoring unit 1420 has a function of monitoring update of the memory 500 by the addition side CPU 200 of the additional processing side execution environment 30 in the monitoring state and when find updating, storing the updated data into the access updated data storing unit 1430.

Stored temporarily as the access updated data 2000 in the access updated data storing unit 1430 by the access state monitoring unit 1420 are update contents of the memory 500 obtained by the addition side CPU 200 of the additional processing side execution environment 30.

The access updated data storage unit 1430 can be realized, for example, by an FIFO system storage unit designed to read last most lately stored data.

Figure 16:
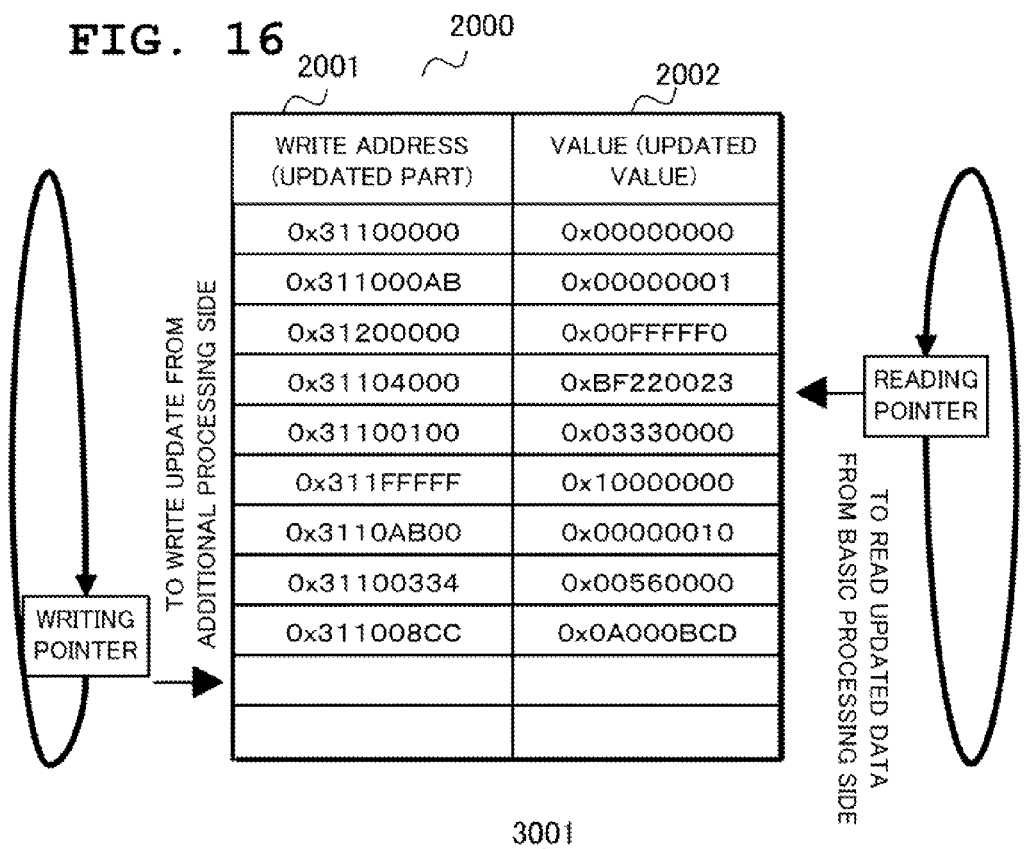
FIG. 16 is a diagram showing an example of access updated data to be stored in an access updated data storage unit according to the second exemplary embodiment of the present invention.

Example of the access updated data 2000 to be stored in the access updated data storage unit 1430 is shown in FIG. 16.

The access updated data storage unit 1430 stores access updated data 2000 having a data structure in which a write address 2001 and a value 2002 of updated data are correlated as shown in FIG. 16.

In the monitoring state, every time data in the memory 500 is updated by the addition side CPU 200, the access state monitoring unit 1420 sequentially writes the write address 2001 and the value 2002 of the updated data into an entry indicated by a writing pointer of the access updated data 2000 in the access updated data storage unit 1430.

In response to a request from the basic side CPU 100, the access state monitoring unit 1420 reads data indicated by a reading pointer (indicating data stored earliest) of the access updated data 2000 in the access updated data storage unit 1430.

In the access updated data 2000 in the access updated data storage unit 1430, coincidence in position of a writing pointer and a reading pointer represents full and the reading pointer one-precedence to the writing pointer represents empty. A bit width of the write address 2001 and the data value 2002 held in the access updated data 2000 in the access updated data storage unit 1430 is arbitrary (e.g. 256 bytes, 4K bytes, or the like).

Data structure of the access updated data 2000 is not limited to the illustrated structure example but be any data structure that can preserve correlation between an address and a value such as a hash list tree.

In addition, at the time of write, if an entry exists whose write address is the same, a data value of the entry may be updated.

Executing such an updating method enables reduction in the number of entries. It is also possible to provide such a filtering function of refraining from recording update within a certain range of addresses into the access updated data 2000. Executed, for example, is filtering control of refraining from recording update within an address range from 0x32800000 to 0x32FFFFFF. Also in this case, the number of entries can be reduced.

Also possible is to record only an increase/decrease from an off-set value as the write address 2001 to be recorded. Use of such a method enables reduction in a bit width. In addition, with only the write address 2001 held, the value of the data may be read from the memory 500.

When in the access updated data 2000 of the access updated data storage unit 1430, the write address 2001 and its data value 2002 of the updated data by the addition side CPU 1200 is recorded from a designated time point (at the time of setting of the monitoring state), in non-stop switching transmission which will be described later, read the access updated data 2000 in response to a request from the basic side CPU 1100 to sequentially enable transfer of updated data. When no updated data exists in the access updated data 2000 of the access updated data storage unit 1430, no updated data will be transferred. In this case, data in the additional processing side region of the memory 500 is the latest, which indicates that transfer of the additional processing side execution environment 30 is enabled. In the present exemplary embodiment, since in a condition where data of the additional processing side region of the memory 500 is not the latest, that is, where the data is being updated from the additional processing side, the data should be transferred, time for transfer of the additional processing side execution environment 30 will be long. Accordingly, in this case, the transfer might not be considered as non-stop transfer. In order to make a time required for transfer be as short as possible, a state where no updated data exists is used as a shift allowed point.

Even when data exists, if its amount is small, such a state may be considered as the shift allowed point.

The access updated data storage unit 1430 may be provided on the memory 500 or in an external storage device connected through the I/O interface 600.

Figure 17:
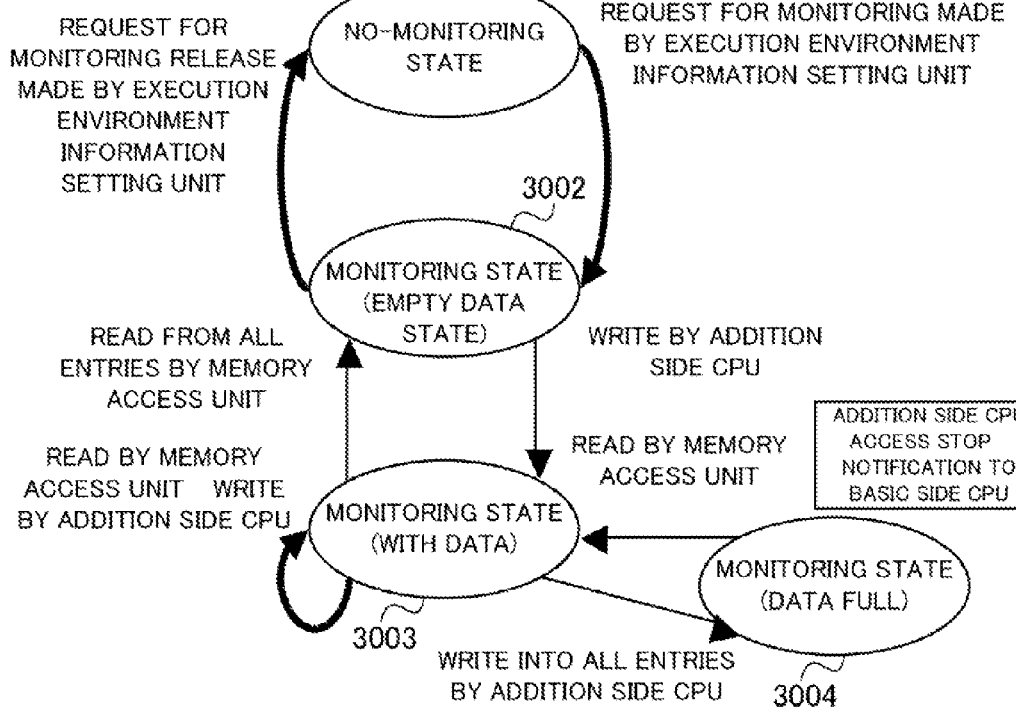
FIG. 17 is a diagram schematically showing a state transition of an access state monitoring unit and the access updated data storage unit according to the second exemplary embodiment of the present invention.

FIG. 17 is a diagram schematically showing a state transition of the access state monitoring unit 1420 and the access updated data storage unit 1430.

In FIG. 17, a state 3001 is a no-monitoring state where no monitoring is executed and a state 3002 is a monitoring state where monitoring is executed based on a monitoring request from the execution environment information setting unit 1340 which indicates a state where no write by the addition side CPU 200 is executed or all the updated data is read to empty the access updated data storage unit 1430. A state 3003 represents a state where updated data is recorded in the access updated data storage unit 1430 in the monitoring state and a state 3004 represents a state where updated data overflows in the access updated data storage unit 1403 in the monitoring state.

Since the memory 500 has the same constitution as that shown in FIG. 5 and the execution environment data 1000 also has the same constitution as that shown in FIG. 6, no description will be made thereof.

(Description of Operation)

(1) First, description will be made of operation of the transfer management unit 1300 and the execution environment monitoring unit 1400 of the above-described information processing device according to the second exemplary embodiment.

(a) Operation of Setting and Releasing Update Monitoring by the Execution Environment Monitoring Unit 1400

Figure 18:
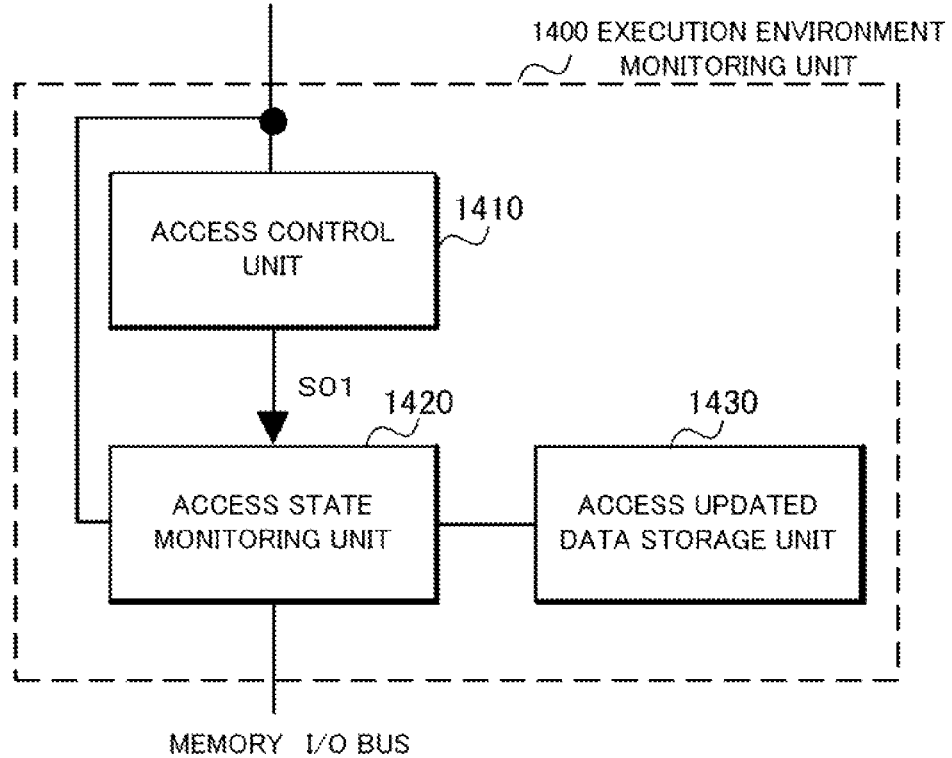
FIG. 18 is a diagram showing operation of setting and releasing of update monitoring executed by the execution environment monitoring unit according to the second exemplary embodiment of the present invention.

Operation of setting and releasing update monitoring by the execution environment monitoring unit 1400 is shown in FIG. 18.

The transfer management unit 1300 notifies an instruction to monitor access update of the memory 500 by the addition side CPU 200 to the access state monitoring unit 1420 of the execution environment monitoring unit 1400 (Step S01 in FIG. 18). Responsively, the access state monitoring unit 1420 starts monitoring access update of the memory 500 by the addition side CPU 200. In addition, the transfer management unit 1300 notifies the access state monitoring unit 1420 of an instruction to release the monitoring of access update of the memory 500 by the addition side CPU 200 (Step S01 in FIG. 18). Responsively, the access state monitoring unit 1420 releases the monitoring of access update of the memory 500 by the addition side CPU 200.

Thus enabling setting and releasing the monitoring of access update of the memory 500 realizes saving of power by releasing the monitoring when monitoring of access update is not required.

(b) Operation of Reading from Memory by the Addition Side CPU

Figure 19:
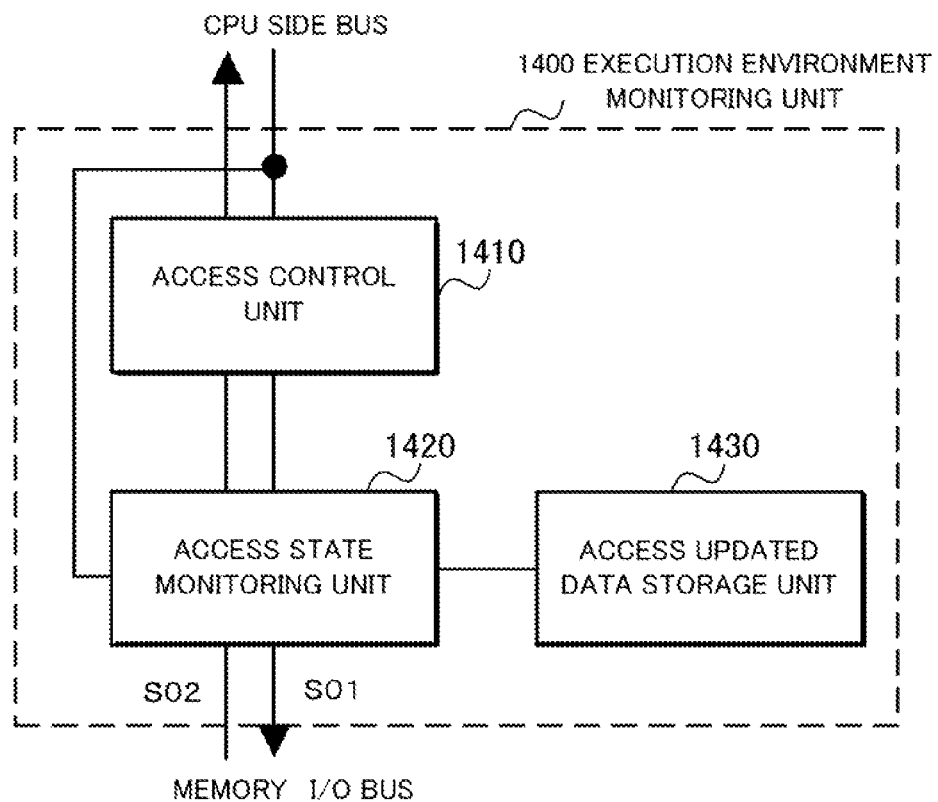
FIG. 19 is a diagram showing memory reading operation by an addition side CPU according to the second exemplary embodiment of the present invention.

Operation of reading from the memory 500 by the addition side CPU 200 is shown in FIG. 19. Step S01: The addition side CPU 200 requests reading from a region of the memory 500 whose read is allowed by the access control unit 1410 of the execution environment monitoring unit 1400. Step S02: The execution environment monitoring unit 1400 having received the read request returns the data read from the memory 500 to the addition side CPU 200.

Figure 20:
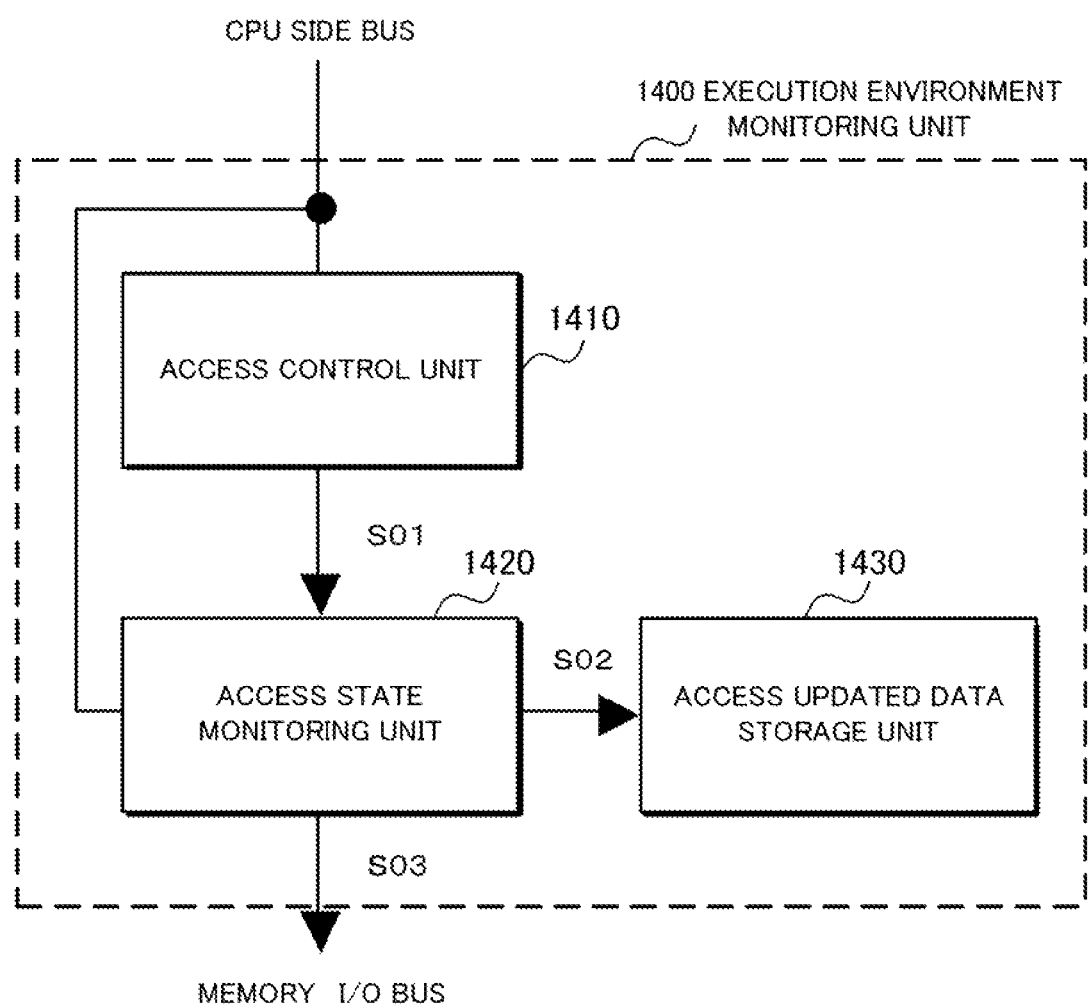
FIG. 20 is a diagram showing memory writing operation by the addition side CPU in a monitoring state according to the second exemplary embodiment of the present invention.

(c) Operation of Writing to the Memory by the Addition Side CPU in the Monitoring State Operation of writing to the memory 500 by the addition side CPU 200 in the monitoring state is shown in FIG. 20.

Step S01: The addition side CPU 200 makes a request for writing to a region of the memory 500 whose write is allowed by the access control unit 1410 of the execution environment monitoring unit 1400.

Step S02: The access state monitoring unit 1420 of the execution environment monitoring unit 1400 having received the write request records the write request into the access updated data 2000 in the access updated data storage unit 1403. Step S03: The access state monitoring unit 1420 of the execution environment monitoring unit 1400 transfers the write request to the memory 500. The access state monitoring unit 1420 also advances a reading pointer to the access updated data 2000 by "1"

(d) Access Updated Data 2000 Reading Operation

Figure 21:
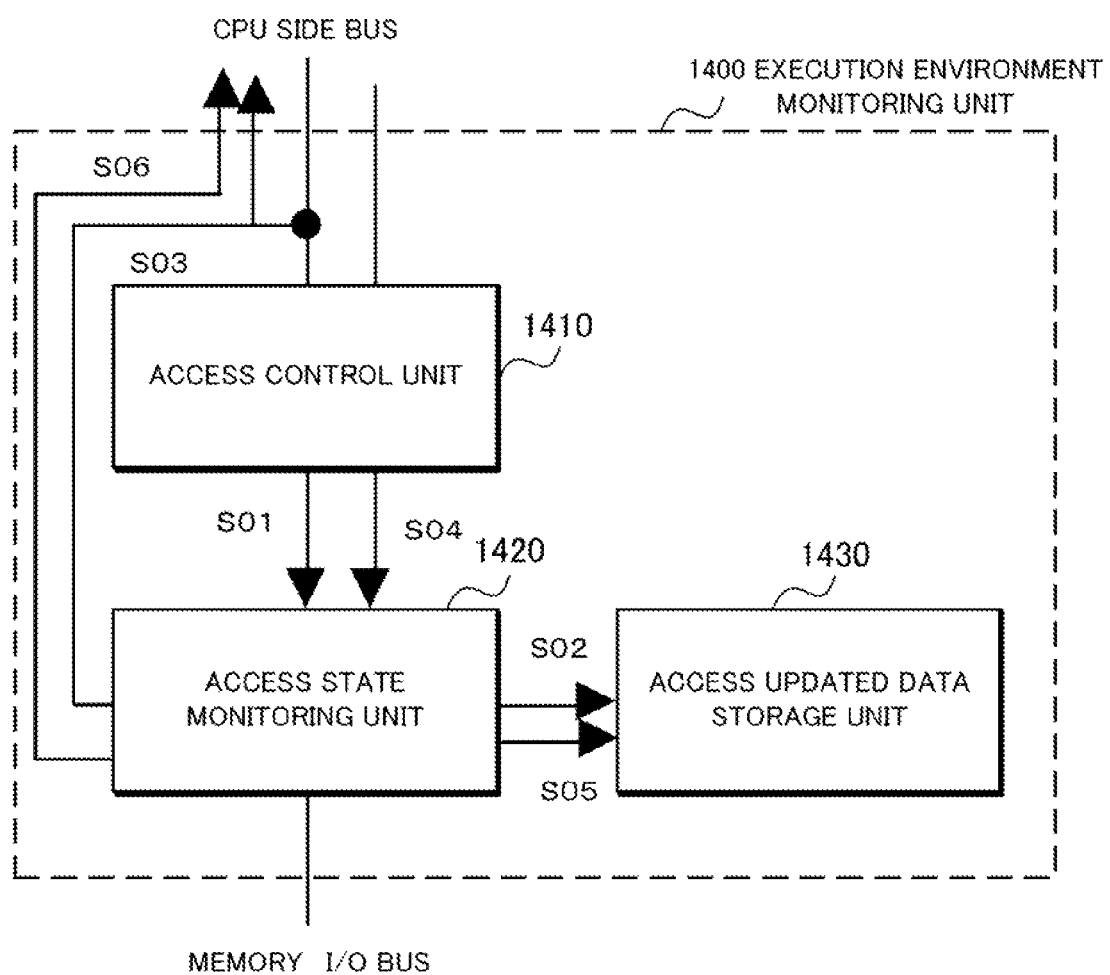
FIG. 21 is a diagram showing access updated data reading operation according to the second exemplary embodiment of the present invention.

Operation of reading the access updated data 2000 is shown in FIG. 21.

Step S01: The basic side CPU 100 makes a request for reading an address of the access updated data 2000.

Step S02: The access state monitoring unit 1420 of the execution environment monitoring unit 1400 reads an address of an entry updated earliest in the access updated data 2000. Step S03: The access state monitoring unit 1420 returns the read address to the basic side CPU 100.

Step S04: The basic side CPU 100 makes a request for reading data of the access updated data 2000. Step S05: The access state monitoring unit 1420 reads a data value of the entry updated earliest in the access updated data 2000. Step S06: The access state monitoring unit 1420 returns the read data value to the basic side CPU 100.

The access state monitoring unit 1420 also advances the reading pointer to the access updated data 2000 by "1".

(e) Operation to be Executed when Access Updated Data Overflows

Figure 22:
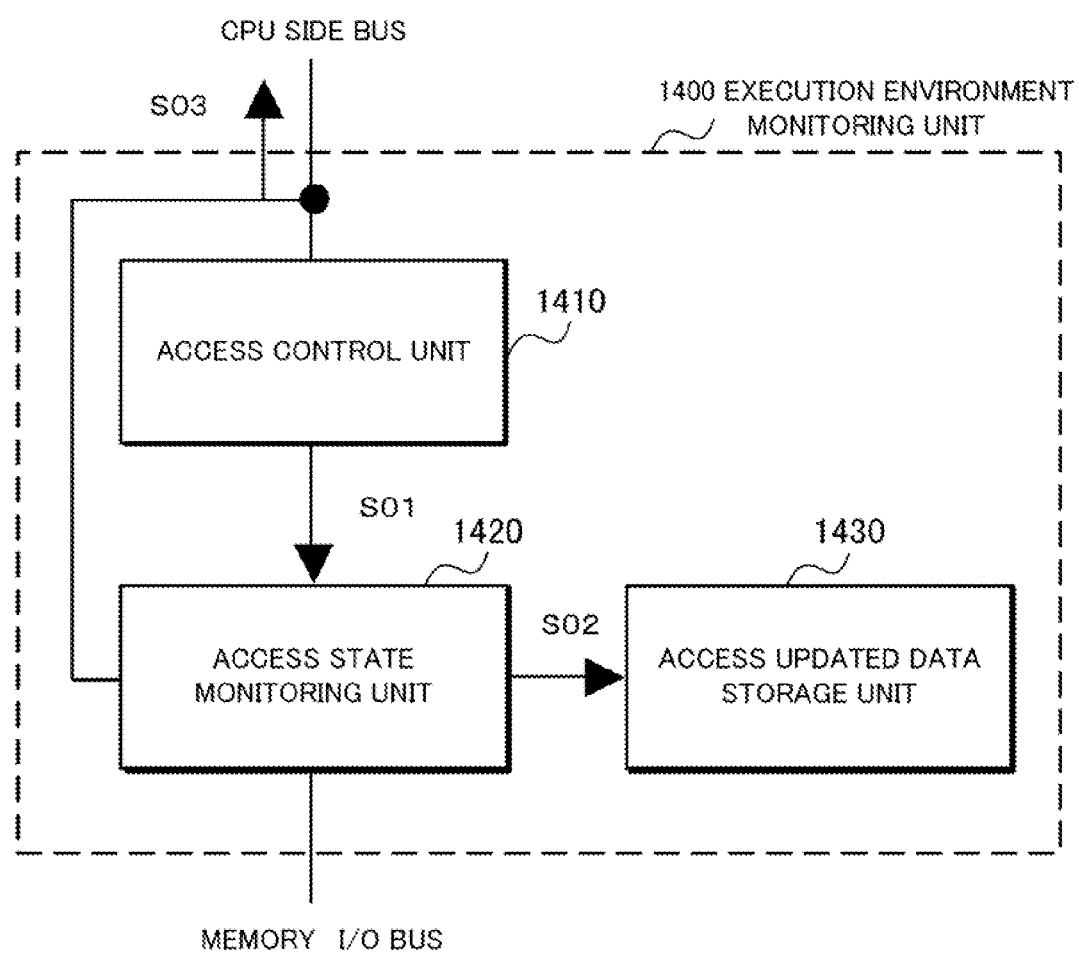
FIG. 22 is a diagram showing operation to be executed when access updated data overflows according to the second exemplary embodiment of the present invention.

Operation to be executed when access updated data overflows is shown in FIG. 22.

Step S01: The addition side CPU 200 makes a request for writing to a region of the memory 500 whose write is allowed by the access control unit 1410 of the execution environment monitoring unit 1400.

Step S02: The access state monitoring unit 1420 of the execution environment monitoring unit 1400 tries to record the write request into the access updated data 2000 but cannot record the same because the data is full.

Step S03: The access state monitoring unit 1420 makes the write request be pending (put into a waiting state) to notify the transfer management unit 1300 of an access updated data overflow.

(f) Operation for Solving Access Updated Data Overflow

Figure 23:
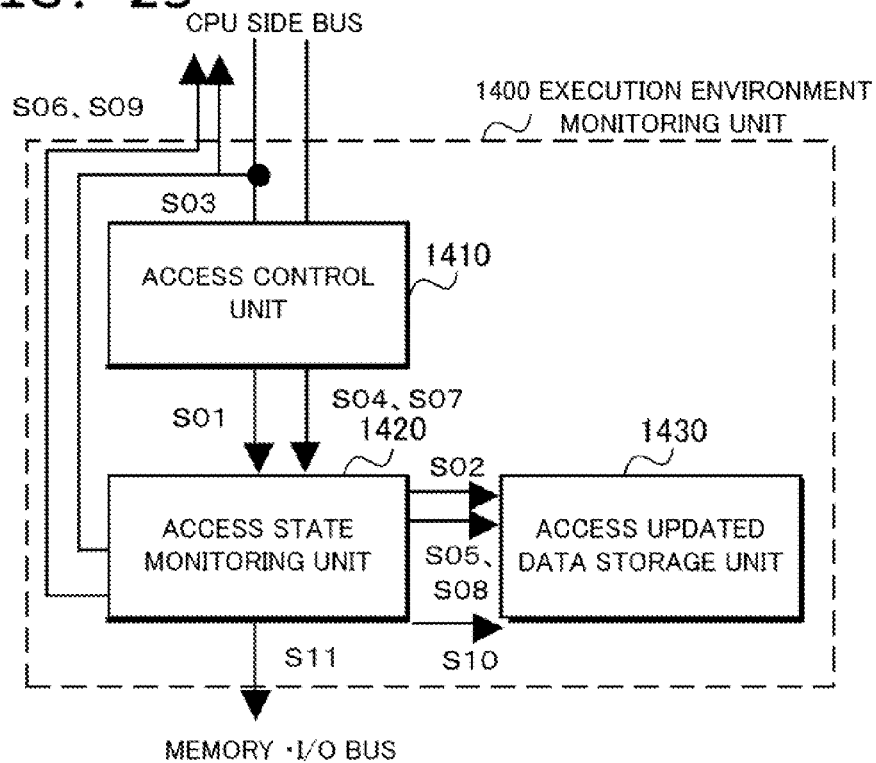
FIG. 23 is a diagram showing operation to be executed to eliminate an overflow of access updated data according to the second exemplary embodiment of the present invention.

Operation for solving an overflow of access updated data is shown in FIG. 23.

Step S01: The addition side CPU 200 makes a request for writing to an allowed memory region. Step S02: The access state monitoring unit 1420 tries to record the write request into the access updated data 2000 but cannot record the same because the data is full.

Step S03: The access state monitoring unit 1420 makes the write request be pending and gives a notification to the transfer management unit 1300. Step S04: The basic side CPU 100 having the transfer management unit 1300 which has received the notification makes a request for reading an address of the access updated data 2000. Step S05: The access state monitoring unit 1420 reads an address of an access updated earliest in the access updated data 2000. Step S06: The access state monitoring unit 1420 returns the read address to the basic side CPU 100.

Step S07: The basic side CPU 100 makes a request for reading data of the access updated data 2000.

Step S08: The access state monitoring unit 1420 reads a data value of the access updated earliest in the access updated data 2000. Step S09: The access state monitoring unit 1420 returns the read data value to the basic side CPU 100.

Step S10: The access state monitoring unit 1420 records the pending write request into the access updated data 2000 because a free entry is generated.

Step A11: The access state monitoring unit 1420 transfers the access to the memory 500.

(g) Operation of Instructing to Set and Release Update Monitoring by the Transfer Management Unit 1300

Figure 24:
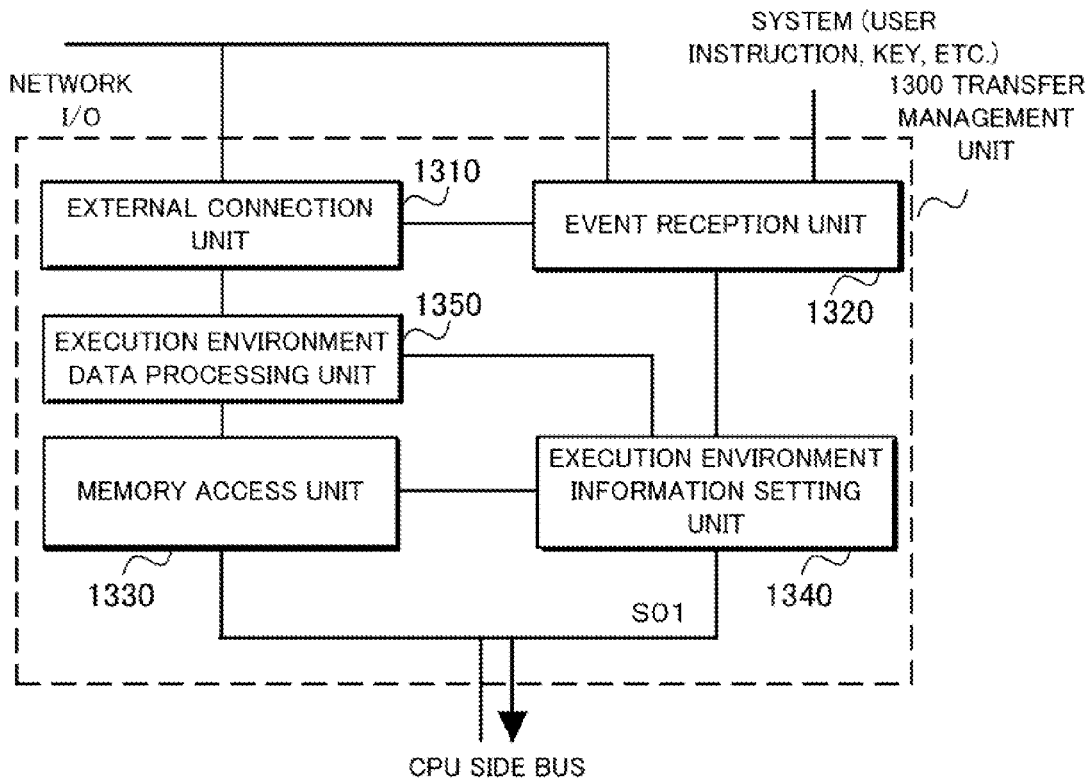
FIG. 24 is a diagram showing operation of instructing on setting and releasing of the update monitoring to be executed by the transfer management unit according to the second exemplary embodiment of the present invention.

Operation of instructing to set and release update monitoring by the transfer management unit 1300 is shown in FIG. 24.

Step S01: The execution environment information setting unit 1340 of the transfer management unit 1300 instructs the access state monitoring unit 1420 of the execution environment monitoring unit 1400 to set update monitoring. After the completion of the transmission of the execution environment data of the additional processing side execution environment 30, the execution environment information setting unit 1340 instructs the access state monitoring unit 1420 of the execution environment monitoring unit 1400 to release the update monitoring.

(h) Operation Related to Notification of Access Updated Data Overflow

Figure 25:
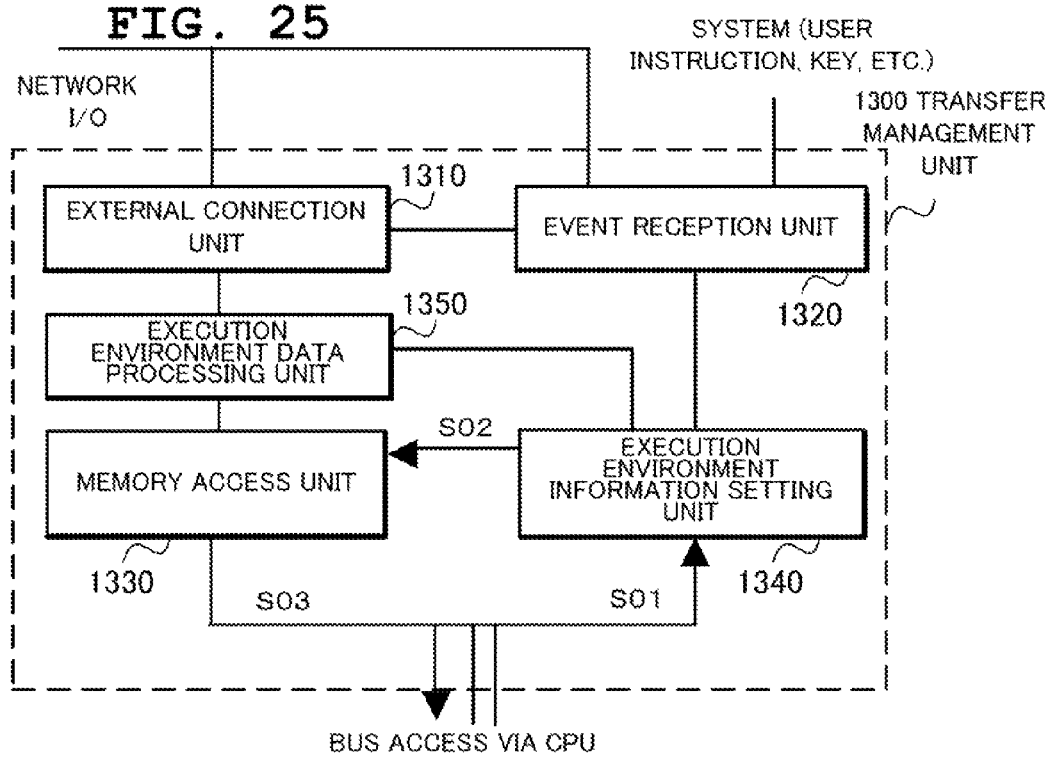
FIG. 25 is a diagram showing operation related to a notification of an access updated data overflow according to the second exemplary embodiment of the present invention.

Operation related to a notification of an access updated data overflow is shown in FIG. 25.

Step S01: The execution environment information setting unit 1340 receives a notification from the execution environment monitoring unit 1400 that the access updated data 2000 overflows. Step S02: The execution environment information setting unit 1340 instructs the memory access unit 1330 to read the access updated data 2000.

Step S03: The memory access unit 1330 executes read of the access updated data 2000.

(2) Description will be made of operation of non-stop transmission and non-stop reception of the additional processing side execution environment 30 according to the second exemplary embodiment with reference to FIG. 26 through FIG. 30.

(a) Entire Operation of Non-Stop Switching Processing

Figure 26:
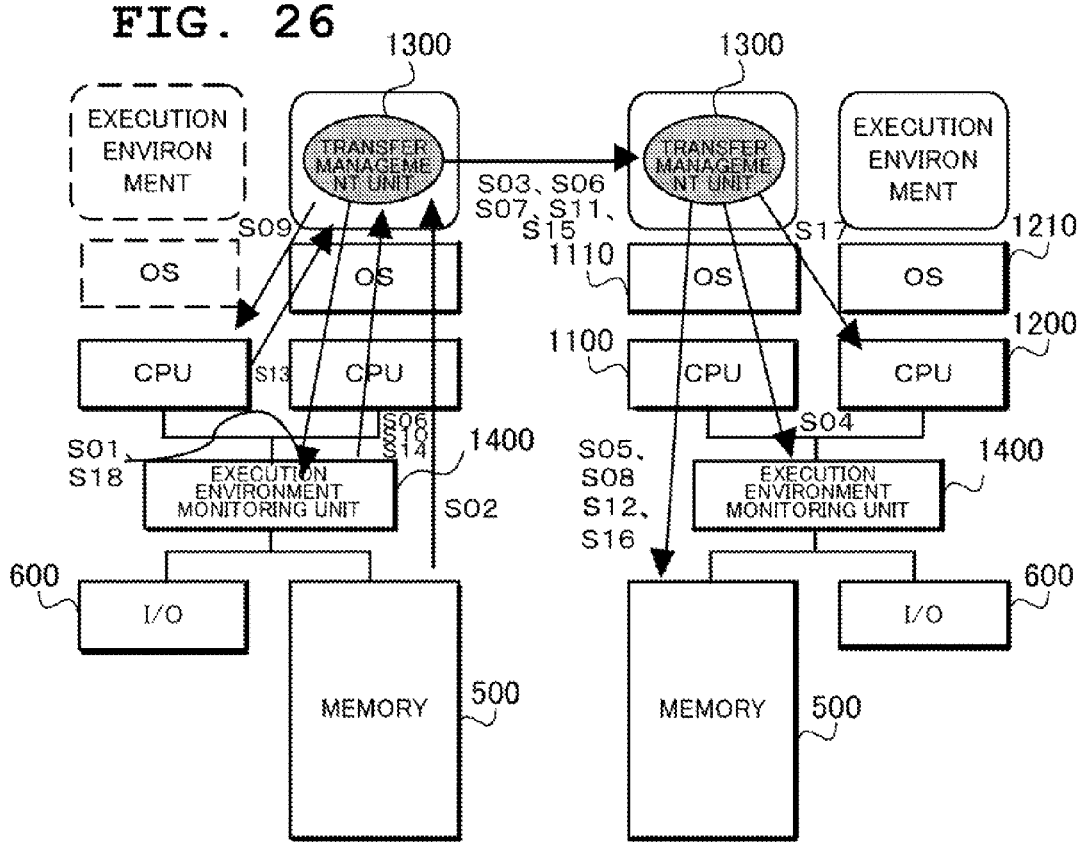
FIG. 26 is a diagram showing the contents of entire operation of non-stop switching processing by a non-stop transfer method according to the second exemplary embodiment of the present invention.

Description will be made of contents of the entire operation of non-stop switching processing by the non-stop transfer method according to the second exemplary embodiment with reference to FIG. 26 which shows a procedure of the non-stop switching processing.

Here, description will be made of operation executed when an instruction on non-stop switching processing is already received.

Step S01: The transfer management unit 1300 of the transmission side information processing device instructs the execution environment monitoring unit 1400 to shift to the update monitoring state.

Step S02: The transfer management unit 1300 on the transmission side reads data from a region of the memory 500 corresponding to the additional processing side execution environment 30 to generate first execution environment data 1000. Step S03: The transfer management unit 1300 on the transmission side sends the first execution environment data 1000 to the transfer management unit 1300 of the reception side information processing device.

Step S04: Out of the first execution environment data 1000, the transfer management unit 1300 on the reception side sends the environment constitution information of the header part 1100 to the execution environment monitoring unit 1400. Step S05: Out of the first execution environment data 1000, the transfer management unit 1300 on the reception side writes the data part 1200 into the memory 500.

Step S06: The transfer management unit 1300 on the transmission side receives, from the execution environment monitoring unit 1400, updated data which is recorded in the access updated data 2000 after entering the update monitoring state. Step S07: The transfer management unit 1300 on the transmission side sends the updated data to the transfer management unit 1300 of the information processing device on the reception side. Step S08: The transfer management unit 1300 on the reception side writes the updated data received into the memory 500. Step S09: The transfer management unit 1300 on the transmission side instructs the addition side CPU 200 to shift to the suspending state. Step S10: The transfer management unit 1300 on the transmission side receives updated data from the execution environment monitoring unit 1400. Step S11: The transfer management unit 1300 on the transmission side sends the updated data to the transfer management unit 1300 on the reception side. Step S12: The transfer management unit 1300 on the reception side writes the updated data into the memory 500. Step S13: The transfer management unit 1300 on the transmission side receives a notification of completion of the shift to the suspending state from the addition side CPU 200. Step S14: The transfer management unit 1300 on the transmission side receives updated data from the execution environment monitoring unit 1400. Step S15: The transfer management unit 1300 on the transmission side sends the updated data to the transfer management unit 1300 on the reception side. Step S16: The transfer management unit 1300 on the reception side writes the updated data into the memory 500. Step S17: The transfer management unit 1300 on the reception side instructs on resuming operation of the addition side CPU 200. Step S18: The transfer management unit 1300 on the transmission side releases setting of the update monitoring state of the execution environment monitoring unit 1400. Designating a plurality of information processing devices as a transmission destination at Steps S03, S11 and S15 enables one-to-N non-stop switching to be realized.

(b) Non-Stop Switching Transmission in Non-Stop Switching Processing

Description will be made of details of non-stop switching transmission in the above-described non-stop switching processing with reference to FIG. 27 and FIG. 28.

Figure 27:
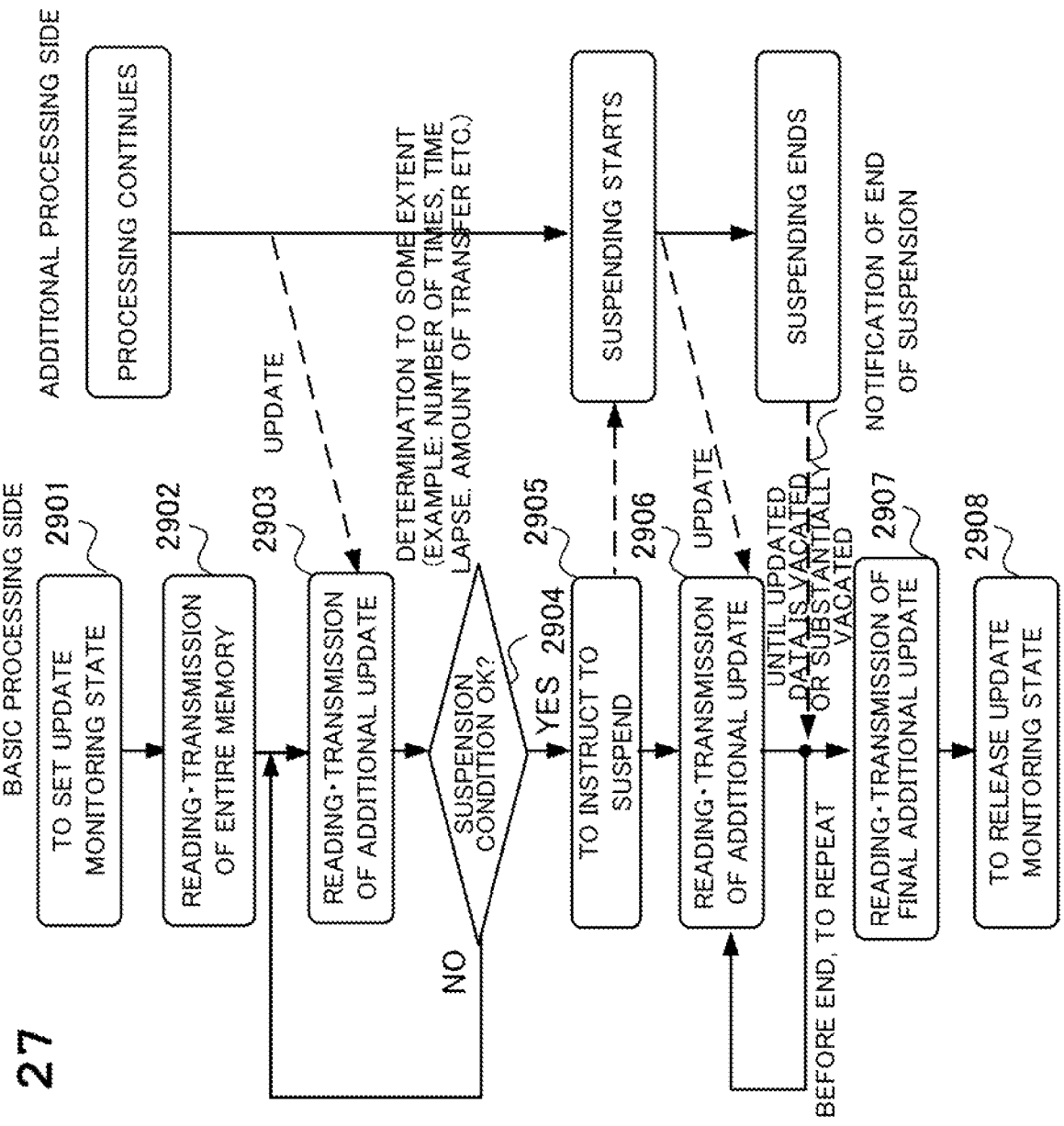
FIG. 27 is a flow chart for use in explaining the contents of operation on a basic processing side and an additional processing side of the information processing device on a transmission side in non-stop switching transmission according to the second exemplary embodiment of the present invention.
Figure 28:
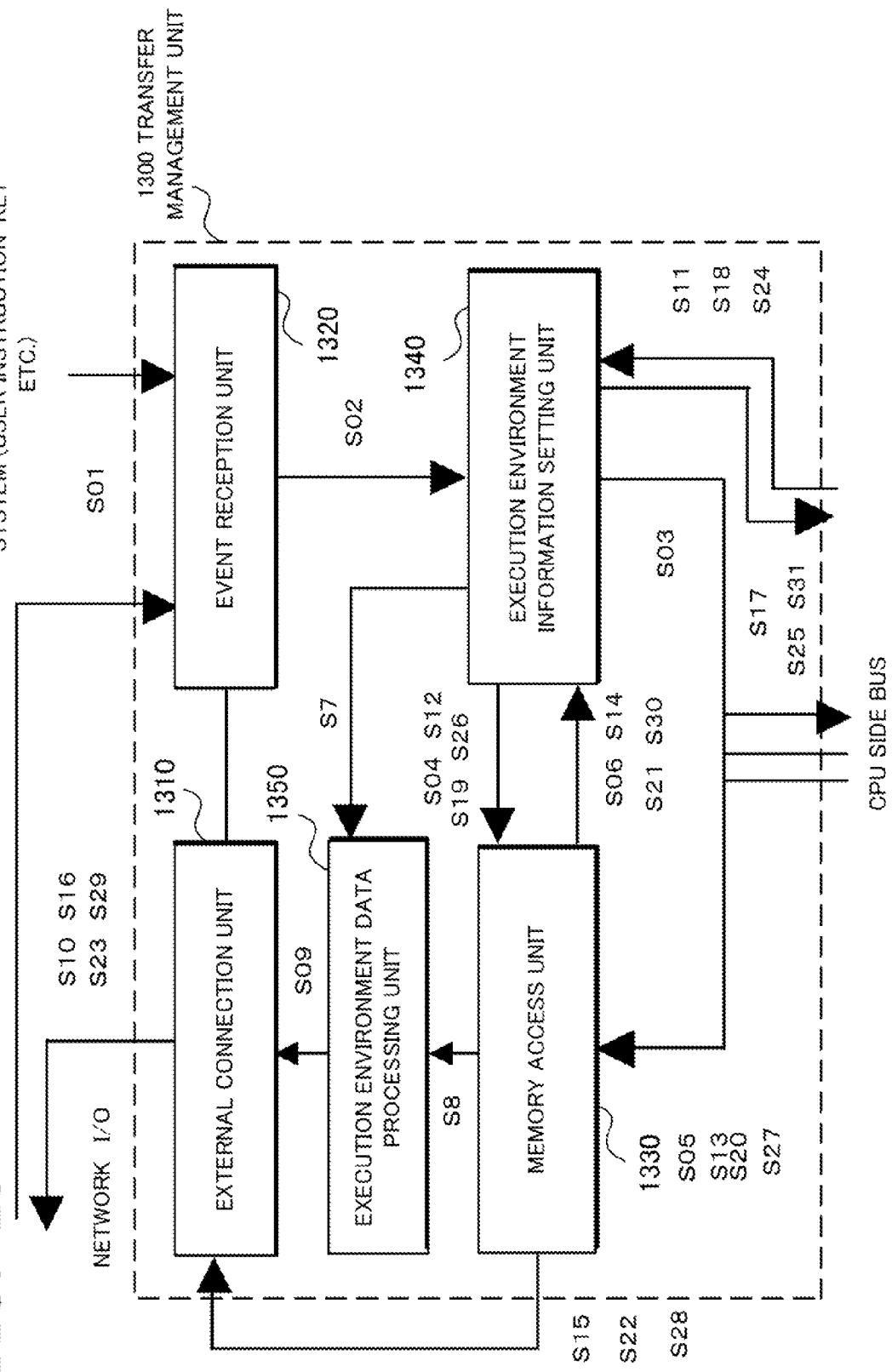
FIG. 28 is a diagram showing detailed operation of the transfer management unit in the non-stop switching transmission according to the second exemplary embodiment of the present invention.

FIG. 27 is a flow chart for use in explaining contents of operation on the basic processing side and the additional processing side of the transmission side information processing device in the non-stop switching transmission.

The transfer management unit 1300 of the transmission side information processing device sets the execution environment monitoring unit 1400 to be in the update monitoring state (Step 2901).

After setting the update monitoring state, the transfer management unit 1300 on the transmission side reads data corresponding to the additional processing side execution environment 30 from the memory 500 and transmits the same to the reception side transfer management unit 1300 as the first execution environment data 1000 (Step 2902).

The transfer management unit 1300 on the transmission side reads updated data which is recorded in the access updated data 2000 from the execution environment monitoring unit 1400 after entering the update monitoring state and transmits the updated data to the reception side (Step 2903).

Next, the transmission side transfer management unit 1300 determines whether a suspension condition set in advance for instructing the addition CPU 200 to suspend is satisfied or not (Step 2904).

The suspension condition is set in advance by such a value as the number of transmissions of updated data, a lapse of time of updated data transmission or a volume of transmission of updated data, and the transfer management unit 1300 on the transmission side compares a current state with a set value as its suspension condition and when the current state exceeds the set value, determines that the suspension condition is satisfied.

As a set value as a suspension condition such as the number of reads of updated data, a lapse of time of updated data transmission or a volume of transmission of updated data, a value is set that enables estimation that the access updated data 2000 is empty or that the remaining volume of updated data is small enough.

When in actual operation, it is clear that ten times of transmissions of the updated data vacates the access updated data 2000 or leaves a small enough volume of updated data, 10 times is set as the number of transmissions of the updated data as the suspension condition.

When the suspension condition is satisfied, the transfer management unit 1300 on the transmission side instructs the addition side CPU 200 to shift to the suspending state (Step 2905).

When data is updated on the addition side during a period from the issuance of the suspension instruction until the completion of the suspending, the transfer management unit 1300 on the transmission side reads updated data which is stored in the access updated data 2000 from the execution environment monitoring unit 1400 and transmits the updated data to the reception side (Step 2906). After the reception of the notification that the suspended state is completed, read the last updated data and transmit the updated data to the reception side (Step 2907). Thereafter, the transfer management unit 1300 on the transmission side releases the execution environment monitoring unit 1400 from the update monitoring state (Step 2908).

Next, description will be made of detailed operation of the transfer management unit 1300 in the above-described non-stop switching transmission with reference to FIG. 28.

Step S01: The event reception unit 1320 of the transfer management unit 1300 receives an instruction on non-stop switching transmission of the additional processing side execution environment 30 in operation by a user's instruction or a key event or through a network or the I/O interface 600.

Step S02: The event reception unit 1320 instructs the execution environment information setting unit 1340 to execute non-stop switching transmission of the additional processing side execution environment 30 in operation.

Step S03: The execution environment information setting unit 1340 of the transfer management unit 1300 sets the monitoring state of the execution environment monitoring unit 1400.

Step S04: The execution environment information setting unit 1340 notifies the memory access unit 1330 of a region of the memory 500 from which read is made. Step S05: The memory access unit 1330 reads data corresponding to the additional processing side execution environment 30 from the notified region of the memory 500.

Step S06: The memory access unit 1330 notifies the execution environment information setting unit 1340 of the completion of read. Step S07: The execution environment information setting unit 1340 notifies the execution environment data processing unit 1350 of environment constitution information such as information about assigned physical address or region size. Step S08: The memory access unit 1330 notifies the execution environment data processing unit 1350 of the read data of the memory 500. Step S09: With the information from the execution environment information setting unit 1340 as the header part 1100 and the data from the memory access unit 1330 as the data part 1200, the execution environment data processing unit 1350 generates the execution environment data 1000 and sends the same to the external connection unit 1310.

Step S10: The external connection unit 1310 transmits the execution environment data 1000 from the execution environment data processing unit 1350 to other information processing device as a transmission destination through the network or the I/O interface 600.

Step S11: The execution environment information setting unit 1340 receives, from the execution environment monitoring unit 1400, a notification that updated data exists in the access updated data 2000 or a notification of an overflow of updated data.

When at this step, no notification that there exists updated data or no notification of an overflow of updated data is received, shift to the processing of Step S17.

Step S12: The execution environment information setting unit 1340 instructs the memory access unit 1330 to read the access updated data 2000. Step S13: The memory access unit 1330 repeatedly executes read of the access updated data 2000.

More specifically, until the above-described suspension condition is satisfied, repeat reading of updated data. Step S14: The memory access unit 1330 notifies to the execution environment information setting unit 1340 that reading of updated data is executed until the suspension condition is satisfied (until the access updated data 2000 is vacated or substantially vacated). Step S15: The memory access unit 1330 transfers a value of the access updated data 1000 read to some extent to the external connection unit 1310.

Step S16: The external connection unit 1310 transmits the relevant data as an additional update of the execution environment data 1000. Step S17: The execution environment information setting unit 1340 instructs the addition side CPU 200 to suspend an execution environment in operation through an inter-processor interruption. Step S18: The execution environment information setting unit 1340 receives from the execution environment monitoring unit 1400 a notification that there exists updated data in the access updated data 2000 or a notification of an overflow of updated data. When at this step, neither a notification that there exists updated data nor a notification of an overflow of updated data is received, shift to the processing of Step S24.

Step S19: The execution environment information setting unit 1340 instructs the memory access unit 1330 to read the access updated data 2000. Step S20: The memory access unit 1330 repeatedly executes read of the access updated data 2000. Step S21: The memory access unit 1330 notifies the execution environment information setting unit 1340 that data reading is executed until the access updated data 2000 is vacated or substantially vacated. Step S22: The memory access unit 1330 transfers a value of the access updated data 2000 read to some extent to the external connection unit 1310. Step S23: The external connection unit 1310 transmits the relevant data as an additional update of the execution environment data 1000.

Step S24: The execution environment information setting unit 1340 receives a notification of suspension completion through an inter-process interruption. Step S25: The execution environment information setting unit 1340 executes clock stop, power supply stop and resetting of the addition side CPU 200. Step S26: The execution environment information setting unit 1340 instructs the memory access unit 1330 to read the access updated data 2000. Step S207: The memory access unit 1330 executes read of updated data until the access updated data 2000 is vacated. Step S28: The memory access unit 1330 transfers the value of the read access updated data 2000 to the external connection unit 1310. Step S29: The external connection unit 1310 transmits the relevant data as a final additional update of the execution environment data 1000. Step S30: The memory access unit 1330 notifies the execution environment information setting unit 1340 that data is read until it is vacated. Step S31: The execution environment information setting unit 1340 instructs the execution environment monitoring unit 1400 to release the update monitoring state of the addition side CPU.

(c) Non-Stop Switching Reception in Non-Stop Switching Processing

Description will be made of details of non-stop switching reception in the above-described non-stop switching processing with reference to FIG. 29 and FIG. 30.

FIG. 29 is a flow chart for use in explaining contents of operation on the basic processing side and the additional processing side of the reception side information processing device in the non-stop switching reception.

The transfer management unit 1300 of the reception side information processing device receives an instruction on non-stop switching reception (Step 3101).

Receive the execution environment data 1000 first transmitted from the transmission side to set the additional processing side execution environment 30 based on its header part 1100, as well as writing the data of the data part 1200 into the memory 500 (Step 3102).

Sequentially receive an additional update of the execution environment data 1000 to write the same in a relevant region in the memory 500 (Step 3103).

Receive the final additional update and write the same in a relevant region of the memory 500 (Step 3104).

Execute start-up of the additional processing side execution environment 30 (Step 3105).

Next, description will be made of detailed operation of the transfer management unit 1300 on the reception side in the above-described non-stop switching reception with reference to FIG. 30.

Step S01: The event reception unit 1320 of the transfer management unit 1300 receives an instruction on non-stop switching reception of a certain additional processing side execution environment 30 by a user's instruction or a key event through the I/O interface 600.

Step S02: The event reception unit 1320 instructs the external connection unit 1310 to receive the execution environment data 1000. Step S03: The external connection unit 1310 executes first reception of the execution environment data 1000 designated. Step S04: The external connection unit 1310 transfers the header part 1100 of the received execution environment data 1000 to the execution environment information setting unit 1340. Step S05: The execution environment information setting unit 1340 analyzes the header part 1100.

In this analysis, based on, for example, the region size information 1103 of the header part 1100, check whether a required region of the non-volatile memory 510 and a required region of the RAM 520 are ensured or the like to determine a region of the memory 500 to which write is made based on the assigned address information 1104.

Then, instruct the execution environment monitoring unit 1400 to change the setting such that the addition side CPU 200 can access the determined region of the memory 500.

Step S06: The external connection unit 1310 transfers the data part 1200 of the received execution environment data 1000 to the memory access unit 1330. Step S07: The execution environment information setting unit 1340 notifies the memory access unit 1330 of a region of the memory 500 to which write is made.

Step S08: The memory access unit 1330 writes the relevant data part 1200 into the notified region of the memory 500. Step S09: The memory access unit 1330 notifies the execution environment information setting unit 1340 of the completion of write to the memory 500.

Step S10: The external connection unit 1310 receives additional update of the execution environment data 1000. Step S11: The external connection unit 1310 transfers the data equivalent to the received additional update to the memory access unit 1330.

Step S12: The memory access unit 1330 writes the received data equivalent to the additional update into the memory 500. Step S13: The memory access unit 1330 notifies the execution environment information setting unit 1340 of the completion of write to the memory 500.

Step S14: The external connection unit 1310 receives the final additional update of the execution environment data 1000.

Step S15: The external connection unit 1310 transfers the data equivalent to the additional update to the memory access unit 1330.

Step S16: The memory access unit 1330 writes the data equivalent to the final additional update into the memory 500. Step S17: The memory access unit 1330 notifies the execution environment information setting unit 1340 of the completion of the write to the memory 500. Step S18: Upon receiving a notification of the completion of the write, the execution environment information setting unit 1340 executes supply of power and clock and release of resetting of the addition side CPU.

Effects of the Second Exemplary Embodiment

Thus structured to operate, the information processing device according to the second exemplary embodiment of the present invention attains the following effects.

(1) Since it is structured to transmit the execution environment data 1000 of the additional processing side execution environment 30 operable on the addition side CPU 200, monitor data thereafter updated by the addition side CPU 200 by the execution environment monitoring unit 1400 and record the data as access updated data to transfer the access updated data as an additional update, it is possible to transfer the additional processing side execution environment 30 to other device while operating the additional processing side execution environment 30 (in an extremely short stop time) on the addition side CPU 200.

(2) Transferring the additional processing side execution environment 30 including an OS of a predetermined information processing device to other information processing device enables a plurality of information processing devices to share the same additional processing side execution environment 30 with ease. As a result, the same execution environment can be shared by a plurality of terminals.

(3) While so far employed transfer of an execution environment using a virtual machine degrades basic performance such as a processing rate of an execution environment and requires a large amount of non-volatile memory for shifting an environment, the first exemplary embodiment enables basic performance of an execution environment to be maintained and eliminates the need of a large amount of memory for transfer because the additional processing side execution environment 30 operating on the addition side CPU 200 having a multi-processor structure is transferred to other information processing device.

(4) In addition, while transfer using a virtual machine requires new development of software (device driver or the like) for specializing in a virtual machine, because the present exemplary embodiment has a structure to transfer the additional processing side execution environment 30 operating on the addition side CPU as execution environment data, new development of software (device driver or the like) is not required.

(5) Use of an information processing device maintaining security is possible by downloading the additional processing side execution environment 30 from other device in the on-line environment, operating the incorporated additional processing side execution environment 30 in the off-line environment to process data, again returning to the on-line environment and uploading the additional processing side execution environment 30 to other device to restore the same.

Third Exemplary Embodiment

Next, a third exemplary embodiment of the present invention will be described.

Figure 31:
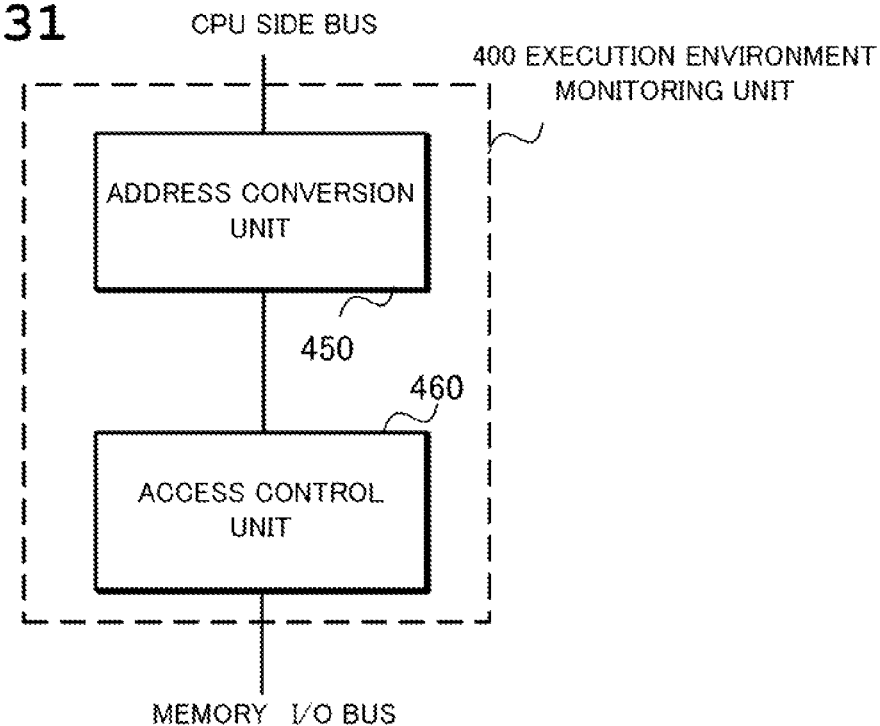
FIG. 31 is a block diagram showing a structure of an execution environment monitoring unit of an information processing device according to a third exemplary embodiment of the present invention.

FIG. 31 is a diagram showing a structure of the execution environment monitoring unit 400 (1400) of an information processing device according to a third exemplary embodiment.

The execution environment monitoring unit 400 (1400) according to the third exemplary embodiment, unlike the first and second exemplary embodiments, comprises an address conversion unit 450 and an access control unit 460.

The address conversion unit 450 has a function of, when the additional processing side execution environment 30 is transferred between information processing devices, if in the memory 500, each device has a different address of a data region of the additional processing side execution environment 30, converting an address of the memory 500 in which data is written on the reception side into an address matching address information included in the header part 1100 of the execution environment data 1000.

The access control unit 460 has a function of controlling an access to the memory 500 by the addition side CPU 200 based on an address converted by the address conversion unit 450.

While the above-described exemplary embodiment has been described with respect to an example where between information processing devices, the additional processing side execution environment 30 is transferred by copying or shifting with each other, possible is a structure in which other than the information processing device formed as a single independent device such as a portable terminal device, the above-described information processing device is formed as a module (or chip) of an electronic device (LSI mounted on vehicle etc.) to copy or shift the additional processing side execution environment between the modules.

Figure 35:
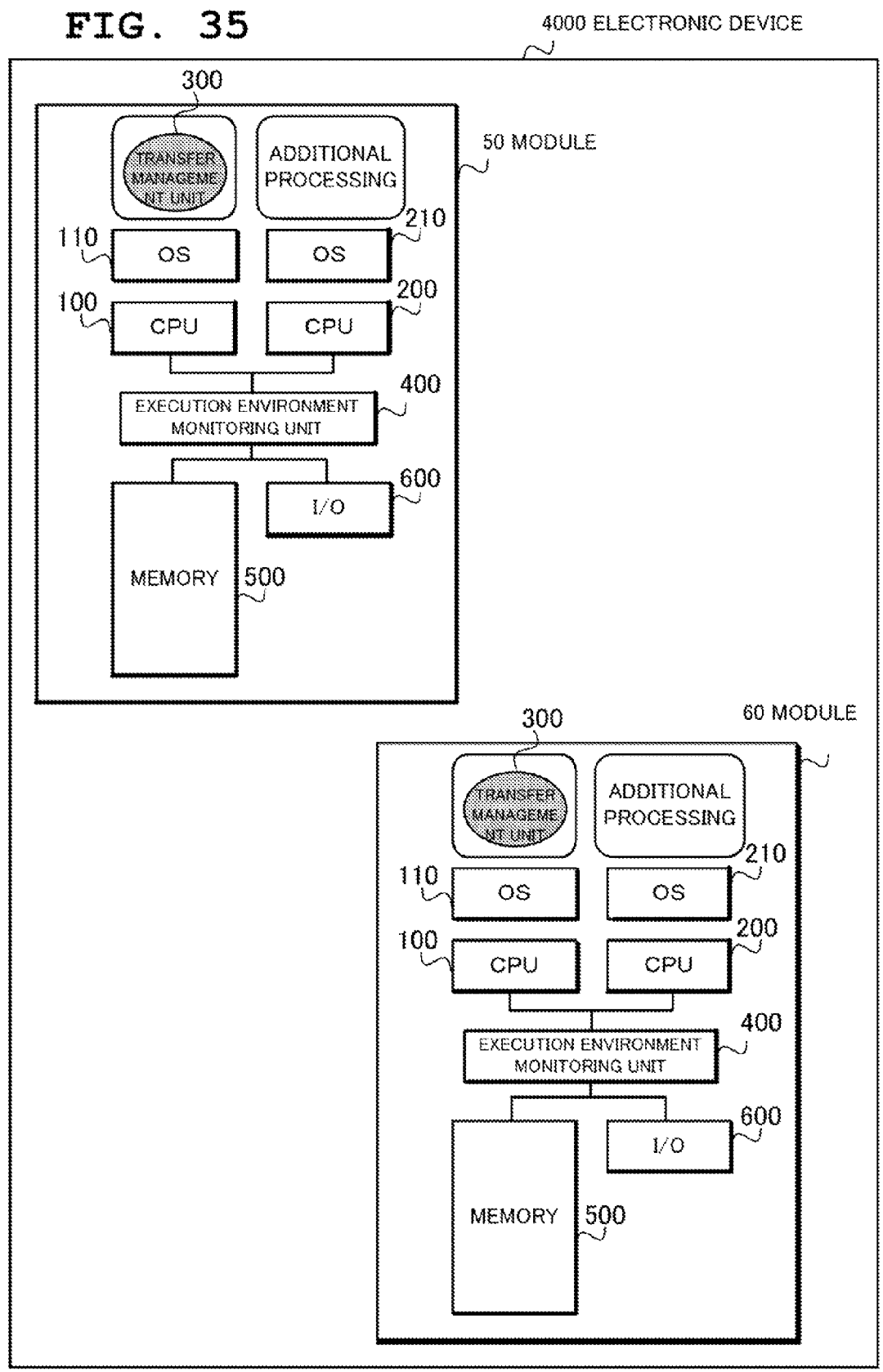
FIG. 35 is a diagram for use in explaining a modification example to which the information processing device according to the present invention is applied.

Structure of an application example of such first through third exemplary embodiments as described in the foregoing is shown in FIG. 35. An electronic device 4000 (e.g. LSI mounted on vehicle) has a plurality of devices having the structure of the first through third information processing devices as modules (or chips) 50 mounted to copy or shift the additional processing side execution environments with each other between the modules 50.

Fourth Exemplary Embodiment

Next, a fourth exemplary embodiment of the present invention will be described.

Figure 32:
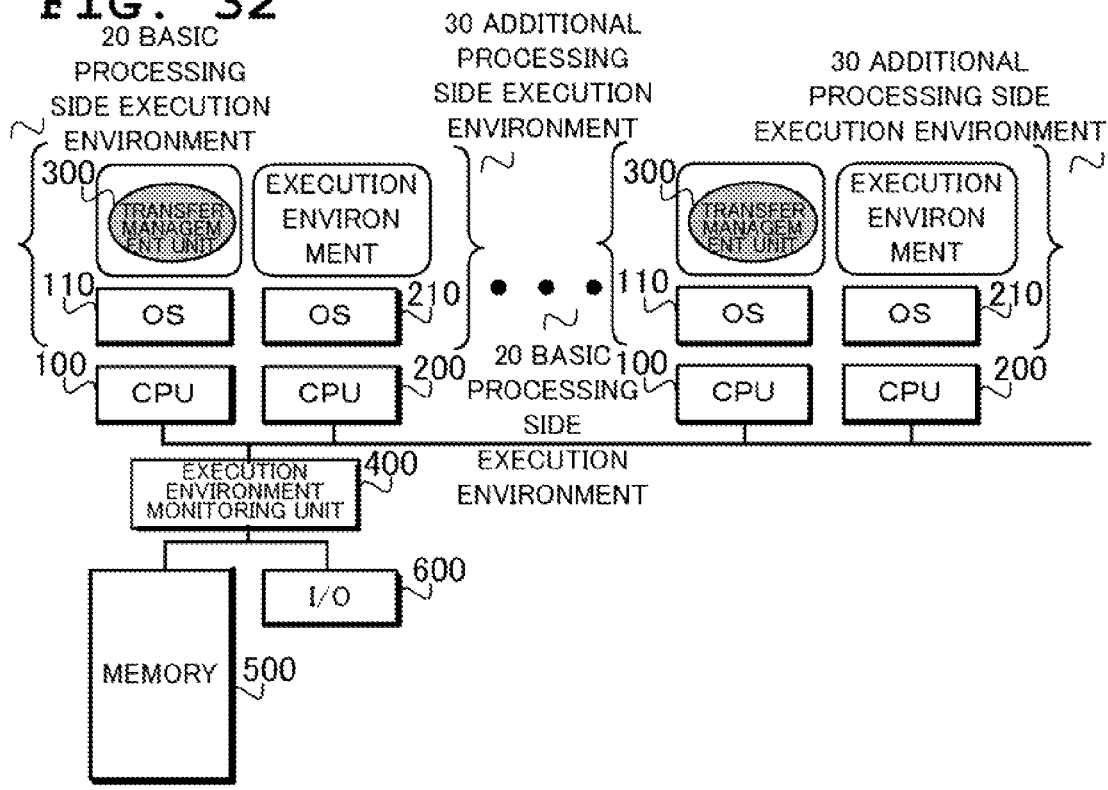
FIG. 32 is a block diagram showing a structure of an information processing device according to a fourth exemplary embodiment of the present invention.

FIG. 32 is a diagram showing a structure of an information processing device according to the fourth exemplary embodiment.

Although the above-described first and second exemplary embodiments have been described with respect to the structure in which the additional processing side execution environment 30 is transferred among a plurality of information processing devices by shifting or copying by the stop transfer method or the non-stop transfer method, the present invention can be structured such that in a processing device comprising a plurality of basic side CPUs 100 and basic processing side execution environments 20 and a plurality of addition side CPUs 200 and additional processing side execution environments 30, the additional processing side execution environment 30 on a certain addition side CPU 200 is transferred onto other addition side CPU 200 by the stop transfer method or the non-stop transfer method.

FIG. 32 shows such a structure example which comprises a plurality of pairs of the basic side CPU 100 and the basic processing side execution environment 20, and pairs of the addition side CPU 200 and the additional processing side execution environment 30.

The structure example shown in FIG. 32 is one example only and it may be a structure, for example, in which each of two basic processing sides has at least two additional processing sides.

Possible as the application example of the fourth exemplary embodiment is application of such a redundant structure as shown in FIG. 32 to an information processing device (e.g. LSI) mounted on a vehicle which is incorporated for controlling driving of an automobile.

When a control function realized by the additional processing side execution environment 30 operating on one addition side CPU 200 develops a fault or the like, having such a structure as described above enables stop of the control function to be minimized to restore the function by transferring the additional processing side execution environment 30 to other addition side CPU 200.

While in the above-described fourth exemplary embodiment, shown is the example in which the present invention is applied to an information processing device having a so-called multi-core structure, it is apparent that the present invention is applicable to an information processing device of a many-core structure having a further large number of cores.

When the present invention is applied to an information processing device (LSI) mounted on vehicle, as the structure shown in FIG. 35 illustrated as an application example of the first through third exemplary embodiments, copying or shifting of a control function is enabled without damaging reliability and safety by copying or shifting an additional processing side execution environment between modules (or chips) having a distributed memory structure.

Moreover, when copying or shifting an additional processing side execution environment between modules (or chips) having a shared memory structure (structure in which a plurality of cores share a memory), use of such a multi-core or many-core structure as that of the fourth exemplary embodiment enables a control function to be copied or shifted without damaging reliability and safety.

First Application Example

In the following, an application example 1 to which the information processing device according to the present invention is applied will be described with reference to FIG. 33.

Figure 33:
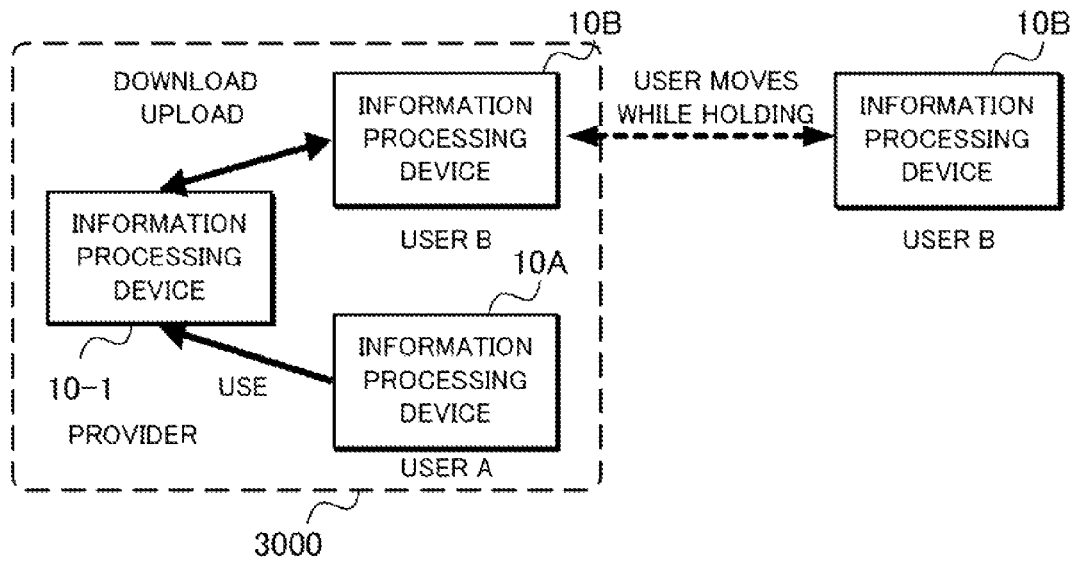
FIG. 33 is a diagram for use in explaining an application example 1 to which the information processing device according to the present invention is applied.

In FIG. 33, shown is an example where a provider of the additional processing side execution environment 30 which is an environment including an OS and an application as additional processing transfers the additional processing side execution environment 30 from an information processing device 10-1 of the present invention to information processing devices 10A and 10B of users A and B of the additional processing side execution environment 30 by the above-described method according to the first or second exemplary embodiment.

In a communication area 3000 in which devices are allowed to communicate with each other, by receiving the additional processing side execution environment 30 from the information processing device 10-1 of a provider or transmitting the additional processing side execution environment 30 to the information processing device 10-1 of the provider, the information processing devices 10A and 10B of the users A and B are allowed to use a plurality of kinds of execution environments that the provider owns by exchanging or the like.

Second Application Example

In the following, an application example 2 to which the information processing device according to the present invention is applied will be described with reference to FIG. 34.

Figure 34:
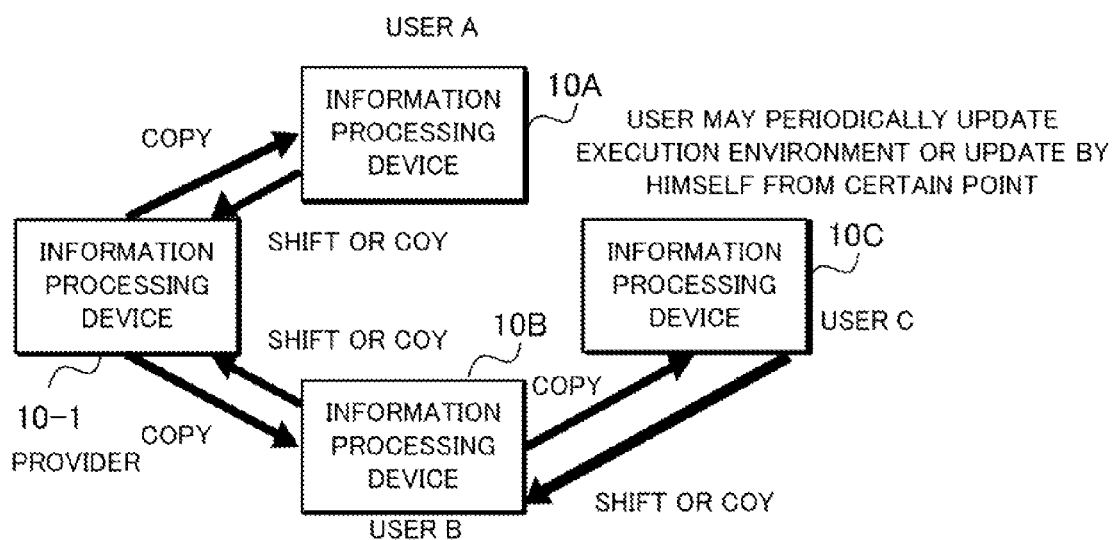
FIG. 34 is a diagram for use in explaining an application example 2 to which the information processing device according to the present invention is applied.

In FIG. 34, shown is an example where a provider of the additional processing side execution environment 30 which is an environment including an OS and an application as additional processing transfers the additional processing side execution environment 30 from the information processing device 10-1 of the present invention to the information processing devices 10A and 10B of the users of the additional processing side execution environment 30 by copying and the information processing device 10B of the user further transfers the environment to an information processing device 10C of other user by copying by the method according to the above-described first or second exemplary embodiment.

By periodically or arbitrarily copying the additional processing side execution environment 30 from the information processing device 10-1 of the provider, the information processing devices 10A and 10B of the users A and B are allowed to obtain an execution environment having a new application or device driver as additional processing. The information processing device 10C of the user C periodically or arbitrarily copies the additional processing side execution environment 30 from the information processing device 10B of the user B.

In FIG. 34, it is also possible to back up an execution environment by the periodical transfer, by the information processing devices 10A and 10B of the users A and B, of their own execution environments to the information processing device 10-1 of the provider and by the transfer to the information processing device 10B by the information processing device 10C of the user C. Thus backed-up execution environment can be restored on the side of each user by copying of an execution environment from the information processing device 10-1 of the provider and the information processing device 10B of the user described in the foregoing.

In the above-described example, the execution environment monitoring units 400 and 1400 can be realized by dedicated hardware and also by software. In addition, the functions of the execution environment monitoring units 400 and 1400 can be realized also by a virtual machine.

Furthermore, it is not always necessary for the basic processing side execution environment 20 to comprise the OS 110 and possible is a structure in which the functions of the transfer management units 300 and 1300 are realized in hardware and software by the basic side CPU 100.

While the present invention has been described with respect to the preferred exemplary embodiments and examples in the foregoing, the present invention is not necessarily limited to the above-described exemplary embodiments and examples but can be implemented in various forms without departing from the spirit and scope of its technical idea.

What is claimed is:

1. An information processing device having a multi-processor structure including a first CPU forming a first execution environment of basic processing and a second CPU forming a second execution environment of additional processing, wherein
said first execution environment includes an operating system and an application operable on the operating system, and which comprises:
a basic side processing unit which executes said basic processing;
said second execution environment includes an operating system and an application operable on the operating system, and which comprises:
an addition side processing unit which executes said additional processing; wherein
a execution environment monitoring unit which filters an access request from said first CPU and said second CPU, monitors an updated memory access issued by said second CPU in accordance with a monitoring state, and stores said updated memory access, and
a transfer management unit provided in said basic side processing unit, wherein said transfer management unit
(a) controls said execution environment monitoring unit, (b) reads updated memory access data from said execution environment monitoring unit, (c) transfers (i) execution environment data including constitution information of said second execution environment of the additional processing to be executed at said addition side processing unit, (ii) data in a memory corresponding to the second execution environment and (iii) said updated memory access data to other information processing device, and (d) restores said second execution environment based on said execution environment data received at other information processing device to re-start said addition side processing unit.

2. The information processing device according to claim 1, wherein
said execution environment data is formed of
a header part which stores said constitution information including a kind of said second execution environment of said additional processing, a size of a memory region and address information of data in said memory, and
a data part which stores a program as data in the memory corresponding to said second execution environment and data to be handled by the program.

3. The information processing device according to claim 1, comprising:
an execution environment monitoring unit for controlling, at the time of restoring said second execution environment based on said execution environment data, a memory access of said addition side processing unit such that the address information included in said constitution information and an address of the memory at which the data in said memory is written match with each other.

4. The information processing device according to claim 3, wherein when data in said memory is written to the memory, said transfer management unit instructs said execution environment monitoring unit to execute control to match the address information included in said constitution information and an address of a memory at which the data in said memory is written with each other.

5. The information processing device according to claim 3, wherein said execution environment monitoring unit comprises
a management data storage unit for storing information whether each memory region is accessible or not such that the address information included in said constitution information and an address of a memory at which the data in said memory is written match with each other, and
a filtering unit for controlling an access of said memory by said addition side processing unit based on said management data in said management data storage unit.

6. The information processing device according to claim 3, wherein said execution environment monitoring unit comprises
an address conversion unit for converting an address of a memory to which the data in said memory is written so as to match with the address information included in said constitution information, and
an access control unit for controlling an access of said memory by said addition side processing unit based on an address converted by said address conversion unit.

7. The information processing device according to claim 3, wherein said transfer management unit sets said execution environment monitoring unit such that a memory region to which data in the memory is to be written is accessible by said addition side processing unit.

8. The information processing device according to claim 1, wherein said transfer management unit, for transferring said execution environment data to said other information processing device by shifting,
stops said addition side processing unit after causing said addition side processing unit to suspend operation of said second execution environment,
reads said data from a memory region of data in the memory corresponding to said second execution environment,
generates said execution environment data from said constitution information of said second execution environment and the read data in said memory, and
transfers said execution environment data generated to an information processing device of the opposite party.

9. The information processing device according to claim 1, wherein said transfer management unit, for transferring said execution environment data to said other information processing device by copying,
causes said addition side processing unit to suspend operation of said second execution environment, reads said data from a memory region of data in the memory corresponding to said second execution environment, generates said execution environment data from said constitution information of said second execution environment and the read data in said memory, and transfers said execution environment data generated to an information processing device of the opposite party.

10. The information processing device according to claim 1, wherein said transfer management unit, receives said execution environment data designated from other information processing device, based on constitution information included in said execution environment data received, determines a memory region to which data in the memory is to be written and sets the memory region to be accessible by said addition side processing unit, writes the data in the memory included in said execution environment data into said memory region determined, and after the completion of write, re-starts said addition side processing unit.

11. The information processing device according to claim 1, wherein said transfer management unit comprises an external connection unit having a function of transferring said execution environment data to other information processing device or accepting execution environment data from other information processing device, an execution environment information setting unit having a function of stopping and re-starting said addition side processing unit and a function of notifying constitution information of said second execution environment, a memory access unit having a function of reading data in the memory corresponding to said second execution environment and writing said execution environment data to the memory, and an execution environment data processing unit for generating said execution environment data from said constitution information notified by said execution environment information setting unit and data in the memory corresponding to said second execution environment which is from said memory access unit.

12. An information processing device having a multi-processor structure including a first CPU forming a first execution environment of basic processing and a second CPU forming a second execution environment of additional processing, wherein said first execution environment includes an operating system and an application operable on the operating system, and which comprises:

a basic side processing unit which executes said basic processing;

said second execution environment includes an operating system and an application operable on the operating system, and which comprises:

an addition side processing unit which executes said additional processing; wherein an execution environment monitoring unit which filters an access request from said first CPU and said second CPU, monitors an updated memory access issued by said second CPU in accordance with a monitoring state, and stores said updated memory access, and a transfer management unit provided in said basic side processing unit, wherein said transfer management unit controls said execution environment monitoring unit, reads updated memory access data from said execution environment monitoring unit, and stops said addition side processing unit to transfer (i) execution environment data including constitution information of said second execution environment of the additional processing to be executed at said addition side processing unit, (ii) data in a memory corresponding to the second execution environment and (iii) said updated memory access data to other said information processing device, and upon receiving said execution environment data from other information processing device, restores said second execution environment on the memory based on said execution environment data to re-start said addition side processing unit.

13. An information processing device having a multi-processor structure including a first CPU forming a first execution environment of basic processing and a second CPU forming a second execution environment of additional processing, wherein said first execution environment includes an operating system and an application operable on the operating system, and which comprises:

a basic side processing unit which executes said basic processing;

said second execution environment includes an operating system and an application operable on the operating system, and which comprises:

an addition side processing unit which executes said additional processing; wherein an execution environment monitoring unit which filters an access request from said first CPU and said second CPU, monitors an updated memory access issued by said second CPU in accordance with a monitoring state, and stores said updated memory access, and a transfer management unit provided in said basic side processing unit, wherein said transfer management unit controls said execution environment monitoring unit, reads updated memory access data from said execution environment monitoring unit, transfers (i) execution environment data including constitution information of said second execution environment of the additional processing to be executed at said addition side processing unit, (ii) data in a memory corresponding to the second execution environment and (iii) said updated memory access data to other said information processing device without substantially stopping the operation of said addition side processing unit, transfers data updated by said addition side processing unit before thereafter re-starting said addition side processing unit to said other information processing device as additional updated data, and upon receiving said execution environment data from other information processing device, restores said second execution environment based on said execution environment data and said additional updated data to re-start said addition side processing unit.

14. The information processing device according to claim 13, wherein said execution environment data is formed of a header part which stores said constitution information including a kind of said second execution environment of said additional processing, a size of a memory region and address information of data in said memory, and a data part which stores a program as data in the memory corresponding to said second execution environment and data to be handled by the program.

15. The information processing device according to claim 13, comprising:
an execution environment monitoring unit for controlling, at the time of restoring said second execution environment based on said execution environment data, a memory access of said addition side processing unit such that the address information included in said constitution information and an address of the memory at which the data in said memory is written match with each other.

16. The information processing device according to claim 15, wherein said execution environment monitoring unit has an access state monitoring unit for recording data updated by said addition side processing unit into an access updated data storage unit so as to correspond to a read memory address in response to a monitoring instruction from said update management unit.

17. The information processing device according to claim 16, wherein said access updated data storage unit is formed of an FIFO buffer.

18. The information processing device according to claim 16, wherein when data of the same address is updated in succession, said access state monitoring unit records at least latest updated data into said access updated data storage unit.

19. The information processing device according to claim 16, wherein said access state monitoring unit stores, in said updated data storage unit, said updated data within an address range in which updated data recording is required based on information whether updated data recording is allowed or not which is set in advance for each address range of the memory.

20. The information processing device according to claim 13, wherein said transfer management unit, when transferring said execution environment data to said other information processing device,
instructs said access state monitoring unit to monitor said updated data,
reads data in the memory corresponding to said second execution environment from the memory,
generates said execution environment data from said constitution information of said second execution environment and the read data in said memory,
transfers said execution environment data generated to an information processing device of the opposite party,
when said updated data exists in said access updated data storage unit, reads said updated data and transfers the data as additional updated data to the information processing device of the opposite party,
instructs said addition side processing unit to suspend operation of said second execution environment,
after the completion of said suspension, temporarily stops said addition side processing unit, and
releases monitoring executed by said access state monitoring unit.

21. The information processing device according to claim 20, wherein when said updated data exists in said access updated data storage unit or when said updated data overflows, said transfer management unit
repeats reading of said updated data until the volume of said updated data goes not more than a predetermined set value, and
transfers said updated data read to the information processing device of the opposite party as additional updated data.

22. The information processing device according to claim 20, wherein said transfer management unit instructs said addition side processing unit to suspend the operation of said second execution environment at a time point where said updated data of said access updated data storage unit is vacated or goes small enough in volume.

23. The information processing device according to claim 20, wherein during a period from when instructing said addition side processing unit to suspend the operation of said second execution environment until when said suspension is completed, said transfer management unit
repeats reading of said updated data until the volume of said updated data goes not more than a predetermined set value, and
transfers said updated data read to the information processing device of the opposite party as additional updated data.

24. The information processing device according to claim 20, wherein said transfer management unit, upon receiving a notification of an overflow of said updated data from said access state monitoring unit,
brings a request for memory write from said addition side processing unit into a waiting state, and
reads said updated data from said access updated data storage unit and at a time point where said updated data has vacancy, records updated data in response to said write request in the waiting state.

25. The information processing device according to claim 13, wherein said transfer management unit, for receiving said execution environment data from other information processing device,
receives said execution environment data transferred,
based on constitution information included in said execution environment data received, determines a memory region to which data in the memory is to be written and sets the memory region to be accessible by said addition side processing unit,
writes the data in the memory included in said execution environment data into said memory region determined,
when additional updated data is transferred, writes said additional updated data received into said memory region determined, and
after the completion of write, re-starts said addition side processing unit.

26. The information processing device according to claim 13, wherein said transfer management unit comprises
an external connection unit having a function of transferring said execution environment data to other information processing device or accepting execution environment data from other information processing device,
an execution environment information setting unit having a function of stopping and re-starting said addition side processing unit and a function of notifying constitution information of said second execution environment,
a memory access unit having a function of reading data in the memory corresponding to said second execution environment and writing said execution environment data to the memory, and
an execution environment data processing unit for generating said execution environment data from said constitution information notified by said execution environment information setting unit and data in the memory corresponding to said second execution environment which is from said memory access unit.

27. An information processing device having a multi-processor structure including a first CPU forming a first execution environment of basic processing and a second CPU forming a second execution environment of additional processing, wherein said first execution environment includes an operating system and an application operable on the operating system, and which comprises:
a plurality of basic side processing units which execute said basic processing;
said second execution environment includes an operating system and an application operable on the operating system, and which comprises:
a plurality of addition side processing units which execute said additional processing; wherein
an execution environment monitoring unit which filters an access request from said first CPU and said second CPU, monitors an updated memory access issued by said second CPU in accordance with a monitoring state, and stores said updated memory access, and
a transfer management unit provided in one of said plurality of basic side processing units, wherein said transfer management unit (a) controls said execution environment monitoring unit, (b) reads updated memory access data from said execution environment monitoring unit, and (c) transfers (i) execution environment data including information of said second execution environment of the additional processing to be executed at one of said plurality of addition side processing units, (ii) data in a memory corresponding to the second execution environment and (iii) said updated memory access data to other basic side processing unit, and
said transfer unit of the basic side processing unit starts said second execution environment at one of said plurality of addition side processing units based on said execution environment data received.

28. An information processing device having a multi-processor structure including a first CPU forming a first execution environment of basic processing and a second CPU forming a second execution environment of additional processing, wherein said first execution environment includes an operating system and an application operable on the operating system, and which comprises:
a plurality of basic side processing units which execute said basic processing;
said second execution environment includes an operating system and an application operable on the operating system, and which comprises:
a plurality of addition side processing units which execute said additional processing; wherein
an execution environment monitoring unit which filters an access request from said first CPU and said second CPU, monitors an updated memory access issued by said second CPU in accordance with a monitoring state, and stores said updated memory access, and
a transfer management unit provided in one of said plurality of basic side processing units, wherein said transfer management unit
controls said execution environment monitoring unit, reads updated memory access data from said execution environment monitoring unit,
stops one of said plurality of addition side processing units, and
transfers (i) execution environment data including constitution information of said second execution environment of the additional processing to be executed at one of said plurality of addition side processing units, (ii) data in a memory corresponding to the second execution environment and (iii) said updated memory access data to other said basic side processing device, and
said transfer management unit of other basic side processing unit restores said second execution environment on the memory based on said execution environment data to re-start one of said plurality of addition side processing units.

29. An information processing device having a multi-processor structure including a first CPU forming a first execution environment of basic processing and a second CPU forming a second execution environment of additional processing, wherein said first execution environment includes an operating system and an application operable on the operating system, and which comprises:
a plurality of basic side processing units which execute said basic processing; and
said second execution environment includes an operating system and an application operable on the operating system, and which comprises:
a plurality of addition side processing units which execute said additional processing, wherein
an execution environment monitoring unit which filters an access request from said first CPU and said second CPU, monitors an updated memory access issued by said second CPU in accordance with a monitoring state, and stores said updated memory access, and
a transfer management unit provided in one of said plurality of basic side processing units, wherein said transfer management unit
controls said execution environment monitoring unit, reads updated memory access data from said execution environment monitoring unit,
transfers (i) execution environment data including constitution information of said second execution environment of the additional processing to be executed at one of said plurality of addition side processing units, (ii) data in a memory corresponding to the second execution environment and (iii) said updated memory access data to other said basic side processing device without substantially stopping the operation of one of said plurality of addition side processing units, and
transfers data updated by one of said plurality of addition side processing units to said other basic side processing device before thereafter re-starting one of said plurality of addition side processing units as additional updated data, and
said transfer management unit of other basic side processing units restores said second execution environment based on said execution environment data and said additional updated data to re-start one of said plurality of addition side processing units.

30. An execution environment transferring method in an information processing device having a multi-processor structure including a first CPU forming a first execution environment of basic processing and a second CPU forming a second execution environment of additional processing, wherein said first execution environment and said second execution environment include an operating system and an application operable on the operating system, and
when between information processing devices comprising a basic side processing unit for executing said basic processing and an addition side processing unit for executing said additional processing, transferring said second execution environment of the additional processing to be executed in one of said plurality of addition side processing units, said basic side processing unit of said information processing device on the transfer side controls said execution environment monitoring unit, reads updated memory access data from said execution environment monitoring unit, and transfers (i) execution environment data including constitution information of said second execution environment of the additional processing to be executed at one of said plurality of addition side processing units, (ii) data in a memory corresponding to the second execution environment and (iii) said updated memory access data to other information processing device, and said basic processing unit of said information processing device on the reception side restores said second execution environment based on said execution environment data received to re-start one of said plurality of addition side processing units.

31. The execution environment transferring method according to claim 30, wherein said execution environment data is formed of a header part which stores said constitution information including a kind of said second execution environment of said additional processing, a size of a memory region and address information of data in said memory, and a data part which stores a program as data in the memory corresponding to said second execution environment and data to be handled by the program.

32. The execution environment transferring method according to claim 30, wherein an execution environment monitoring unit of said information processing device on the reception side, at the time of restoring said second execution environment based on said execution environment data, controls a memory access of said addition side processing unit such that the address information included in said constitution information and an address of the memory at which the data in said memory is written match with each other.

33. The execution environment transferring method according to claim 32, wherein the execution environment monitoring unit of said information processing device on the reception side controls an access of said memory by said addition side processing unit based on management data which stores information whether each memory region is accessible or not such that the address information included in said constitution information and an address of a memory at which the data in said memory is written match with each other.

34. The execution environment transferring method according to claim 32, wherein said execution environment monitoring unit of said information processing device on the reception side converts an address of a memory to which the data in said memory is written so as to match with the address information included in said constitution information, and controls an access of said memory by said addition side processing unit based on an address converted.

35. The execution environment transferring method according to claim 30, wherein said transfer management unit, for transferring said execution environment data to said other information processing device by shifting, stops said addition side processing unit after causing said addition side processing unit to suspend operation of said second execution environment, reads said data from a memory region of data in the memory corresponding to said second execution environment, generates said execution environment data from said constitution information of said second execution environment and the read data in said memory, and transfers said execution environment data generated to an information processing device of the opposite party.

36. The execution environment transferring method according to claim 30, wherein said basic side processing unit of said information processing device on the transfer side, for transferring said execution environment data to said other information processing device by copying, causes said addition side processing unit to suspend operation of said second execution environment, reads said data from a memory region of data in the memory corresponding to said second execution environment, generates said execution environment data from said constitution information of said second execution environment and the read data in said memory, and transfers said execution environment data generated to the information processing device of the opposite party.

37. The execution environment transferring method according to claim 30, wherein the basic side processing unit of said information processing device on the reception side, receives said execution environment data designated from other information processing device, based on constitution information included in said execution environment data received, determines a memory region to which data in the memory is to be written and sets the memory region to be accessible by said addition side processing unit, writes the data in the memory included in said execution environment data into said memory region determined, and after the completion of write, re-starts said addition side processing unit.

38. An execution environment transferring method in an information processing device having a multi-processor structure including a first CPU forming a first execution environment of basic processing and a second CPU forming a second execution environment of additional processing, wherein said first execution environment and said second execution environment include an operating system and an application operable on the operating system, and when between information processing devices comprising a basic side processing unit for executing said basic processing and an addition side processing unit for executing said additional processing, transferring said second execution environment of the additional processing to be executed in said addition side processing unit, an execution environment monitoring unit of said information processing device on the transfer side filters an access request from said first CPU and said second CPU, monitors an updated memory access issued by said second CPU in accordance with a monitoring state, and stores said updated memory access, and said basic side processing unit of said information processing device on the transfer side controls said execution environment monitoring unit, reads updated memory access data from said execution environment monitoring unit, and stops said addition side processing unit and transfers (i) execution environment data including constitution information of said second execution environment of the additional processing to be executed at said addition side processing unit, (ii) data in a memory corresponding to the second execution environment and (iii) said updated memory access data to other said information processing device, and said basic processing unit of said information processing device on the reception side restores said second execution environment on the memory based on said execution environment data received to re-start said addition side processing unit.

39. An execution environment transferring method in an information processing device having a multi-processor structure including a first CPU forming a first execution environment of basic processing and a second CPU forming a second execution environment of additional processing, wherein said first execution environment and said second execution environment include an operating system and an application operable on the operating system, and when between information processing devices comprising a basic side processing unit for executing said basic processing and an addition side processing unit for executing said additional processing, transferring said second execution environment of the additional processing to be executed in said addition side processing unit, an execution environment monitoring unit of said information processing device on the transfer side filters an access request from said first CPU and said second CPU, monitors an updated memory access issued by said second CPU in accordance with a monitoring state, and stores said updated memory access, and said basic side processing unit of said information processing device on the transfer side controls said execution environment monitoring unit, reads updated memory access data from said execution environment monitoring unit, transfers (i) execution environment data including constitution information of said second execution environment of the additional processing to be executed at said addition side processing unit, (ii) data in a memory corresponding to the second execution environment and (iii) said updated memory access data to other said information processing device without substantially stopping the operation of said addition side processing unit, and transfers data updated by said addition side processing unit before thereafter re-starting said addition side processing unit to other said information processing device as additional updated data, and said basic processing unit of said information processing device on the reception side restores said second execution environment based on said execution environment data and said additional updated data to re-start said addition side processing unit.

40. The execution environment transferring method according to claim 39, wherein said execution environment data is formed of a header part which stores said constitution information including a kind of said second execution environment of said additional processing, a size of a memory region and address information of data in said memory, and a data part which stores a program as data in the memory corresponding to said second execution environment and data to be handled by the program.

41. The execution environment transferring method according to claim 40, wherein said basic side processing unit of said information processing device on the transfer side instructs said execution environment monitoring unit to monitor said updated data, reads data in the memory corresponding to said second execution environment from the memory, generates said execution environment data from said constitution information of said second execution environment and the read data in said memory, transfers said execution environment data generated to an information processing device of the opposite party, when said updated data exists in said access updated data storage unit, reads said updated data and transfers the data as additional updated data to the information processing device of the opposite party, instructs said addition side processing unit to suspend operation of said second execution environment, after the completion of said suspension, temporarily stops said addition side processing unit, and releases monitoring executed by said execution environment monitoring unit.

42. The execution environment transferring method according to claim 41, wherein when said updated data exists in said access updated data storage unit or when said updated data overflows, said basic side processing unit of said information processing device on the transfer side repeats reading of said updated data until the volume of said updated data goes not more than a predetermined set value, and transfers said updated data read to the information processing device of the opposite party as additional updated data.

43. The execution environment transferring method according to claim 41, wherein said basic side processing unit of said information processing device on the transfer side instructs said addition side processing unit to suspend the operation of said second execution environment at a time point where said updated data of said access updated data storage unit is vacated or goes small enough in volume.

44. The execution environment transferring method according to claim 41, wherein during a period from when instructing said addition side processing unit to suspend the operation of said second execution environment until when said suspension is completed, said basic side processing unit of said information processing device on the transfer side repeats reading of said updated data until the volume of said updated data goes not more than a predetermined set value, and transfers said updated data read to the information processing device of the opposite party as additional updated data.

45. The execution environment transferring method according to claim 41, wherein upon receiving a notification of an overflow of said updated data from said access state monitoring unit, said basic side processing unit of said information processing device on the transfer side brings a request for memory write from said addition side processing unit into a waiting state, and reads said updated data from said access updated data storage unit and at a time point where said updated data has vacancy, records updated data in response to said write request in the waiting state.

46. The execution environment transferring method according to claim 39, wherein an execution environment monitoring unit of said information processing device on the reception side, at the time of restoring said second execution environment based on said execution environment data, controls a memory access of said addition side processing unit such that the address information included in said constitution information and an address of the memory at which the data in said memory is written match with each other.

47. The execution environment transferring method according to claim 46, wherein the execution environment monitoring unit of said information processing device on the transfer side causes an access updated data storage unit to record data updated by said addition side processing unit so as to correspond to a read memory address in response to a monitoring instruction.

48. The execution environment transferring method according to claim 47, wherein said access updated data storage unit is formed of an FIFO buffer.

49. The execution environment transferring method according to claim 47, wherein when data of the same address is updated in succession, said execution environment monitoring unit records at least latest updated data into said access updated data storage unit.

50. The execution environment transferring method according to claim 39, wherein the basic side processing unit of said information processing device on the reception side
receives said execution environment data transferred from other information processing device,
based on constitution information included in said execution environment data received, determines a memory region to which data in the memory is to be written and sets the memory region to be accessible by said addition side processing unit,
writes the data in the memory included in said execution environment data into said memory region determined,
when additional updated data is transferred, writes said additional updated data received into said memory region determined, and
after the completion of write, re-starts said addition side processing unit.

51. A non-transitory computer-readable storage medium storing an execution environment transferring program of an information processing device having a multi-processor structure including a first CPU forming a first execution environment of basic processing and a second CPU forming a second execution environment of additional processing, wherein
said first execution environment and said second execution environment include an operating system and an application operable on the operating system,
said execution environment transferring program causes said information processing device,
in order to transfer, between information processing devices comprising a basic side processing unit for executing said basic processing and an addition side processing unit for executing said additional processing, an execution environment of the additional processing to be executed at said addition side processing unit, to execute
a processing of filtering an access request from said first CPU and said second CPU, monitoring an updated memory access issued by said second CPU in accordance with a monitoring state, and storing said updated memory access by an execution environment monitoring unit of said information processing device on the transfer side,
a processing of (a) controlling said execution environment monitoring unit, (b) reading updated memory access data from said execution environment monitoring unit, (c) transferring (i) execution environment data including constitution information of said second execution environment of the additional processing to be executed at said addition side processing unit, (ii) data in a memory corresponding to the second execution environment and (iii) said updated memory access data to other information processing device by said basic side processing unit of said information processing device on the transfer side, and
a processing of restoring said second execution environment based on said execution environment data received to re-start said addition side processing unit by the basic processing unit of said information processing device on the reception side.

52. A non-transitory computer-readable storage medium storing an execution environment transferring program of an information processing device having a multi-processor structure including a first CPU forming a first execution environment of basic processing and a second CPU forming a second execution environment of additional processing, wherein
said first execution environment and said second execution environment include an operating system and an application operable on the operating system,
said execution environment transferring program causes said information processing device,
in order to transfer, between information processing devices comprising a basic side processing unit for executing said basic processing and an addition side processing unit for executing said additional processing, an execution environment of the additional processing to be executed at said addition side processing unit, to execute
a processing of filtering an access request from said first CPU and said second CPU, monitoring an updated memory access issued by said second CPU in accordance with a monitoring state, and storing said updated memory access by an execution environment monitoring unit of said information processing device on the transfer side,
a processing of (a) controlling said execution environment monitoring unit, (b) reading updated memory access data from said execution environment monitoring unit, (c) stopping said addition side processing unit, and (d) transferring (i) execution environment data including constitution information of said second execution environment of the additional processing to be executed at said addition side processing unit, (ii) data in a memory corresponding to the second execution environment and (iii) said updated memory access data to other said information processing device by said basic side processing unit of said information processing device on the transfer side, and
a processing of restoring said second execution environment on the memory based on said execution environment data received to re-start said addition side processing unit by the basic processing unit of said information processing device on the reception side.

53. A non-transitory computer-readable storage medium storing an execution environment transferring program of an information processing device having a multi-processor structure including a first CPU forming a first execution environment of basic processing and a second CPU forming a second execution environment of additional processing, wherein
said first execution environment and said second execution environment include an operating system and an application operable on the operating system,
said execution environment transferring program causes said information processing device, in order to transfer, between information processing devices comprising a basic side processing unit for executing said basic processing and an addition side processing unit for executing said additional processing, an execution environment of the additional processing to be executed at said addition side processing unit, to execute a processing of filtering an access request from said first CPU and said second CPU, monitoring an updated memory access issued by said second CPU in accordance with a monitoring state, and storing said updated memory access by an execution environment monitoring unit of said information processing device on the transfer side, a processing of (a) controlling said execution environment monitoring unit, (b) reading updated memory access data from said execution environment monitoring unit, and (c) transferring (i) execution environment data including constitution information of said second execution environment of the additional processing to be executed at said addition side processing unit, (ii) data in a memory corresponding to the second execution environment and (iii) said updated memory access data to other said information processing device without stopping the operation of said addition side processing unit, a processing of transferring data updated by said addition side processing unit before thereafter re-starting said addition side processing unit to said other information processing device as additional updated data by said basic side processing unit of said information processing device on the transfer side, and a processing of restoring said second execution environment based on said execution environment data and said additional updated data to re-start said addition side processing unit by the basic processing unit of said information processing device on the reception side.

* * * * *

UNITED STATES PATENT AND TRADEMARK OFFICE
CERTIFICATE OF CORRECTION

PATENT NO.       : 8,473,702 B2
APPLICATION NO.  : 12/602871
DATED            : June 25, 2013
INVENTOR(S)      : Inoue et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this
Eighth Day of September, 2015

Michelle K. Lee
*Director of the United States Patent and Trademark Office*